(12) United States Patent
Fassnacht et al.

(10) Patent No.: US 10,932,009 B2
(45) Date of Patent: Feb. 23, 2021

(54) TECHNOLOGIES FOR ANALYZING AND SEARCHING FOR FEATURES IN IMAGE DATA

(71) Applicant: FCB Worldwide, Inc., Chicago, IL (US)

(72) Inventors: Michael Fassnacht, Chicago, IL (US); Mark Jungwirth, Wilmette, IL (US); Kerry Hill, Cary, IL (US); Fernando Espejel, Chicago, IL (US)

(73) Assignee: FCB Worldwide, Inc., Chicago, IL (US)

( * ) Notice: Subject to any disclaimer, the term of this patent is extended or adjusted under 35 U.S.C. 154(b) by 0 days.

(21) Appl. No.: 16/297,124

(22) Filed: Mar. 8, 2019

(65) Prior Publication Data
US 2020/0288209 A1   Sep. 10, 2020

(51) Int. Cl.
| | |
|---|---|
| *H04N 21/482* | (2011.01) |
| *G06F 16/2457* | (2019.01) |
| *G06F 16/2452* | (2019.01) |
| *G06N 20/00* | (2019.01) |
| *H04N 21/2343* | (2011.01) |
| *G06F 16/783* | (2019.01) |

(52) U.S. Cl.
CPC ... *H04N 21/4828* (2013.01); *G06F 16/24522* (2019.01); *G06F 16/24573* (2019.01); *G06F 16/7837* (2019.01); *G06N 20/00* (2019.01); *H04N 21/234336* (2013.01)

(58) Field of Classification Search
CPC ....... H04N 21/4828; H04N 21/234336; H04N 21/84; H04N 21/47205; H04N 19/40; H04N 21/23418; H04N 21/26603; H04N 21/234309; H04N 21/235; H04N 21/2743; G06F 16/7837; G06F 16/24573; G06F 16/24522; G06F 9/30156; G06N 20/00; H03M 7/6011
See application file for complete search history.

(56) References Cited

U.S. PATENT DOCUMENTS

| | | | | |
|---|---|---|---|---|
| 6,374,260 | B1 * | 4/2002 | Hoffert | G10H 1/0058 |
| 9,865,302 | B1 * | 1/2018 | Lyon | G11B 27/00 |
| 10,390,007 | B1 * | 8/2019 | Chen | H04N 13/366 |
| 10,419,790 | B2 * | 9/2019 | Gersten | G06F 16/7867 |

(Continued)

FOREIGN PATENT DOCUMENTS

| | | | | |
|---|---|---|---|---|
| CA | | 2376671 A1 * | 12/2000 | G06Q 30/02 |

*Primary Examiner* — Benjamin R Bruckart
*Assistant Examiner* — Tien M Nguyen
(74) *Attorney, Agent, or Firm* — Taft Stettinius & Hollister LLP

(57) ABSTRACT

A method according to one embodiment includes automatically transcoding a video file to generate a plurality of transcoded files, wherein the plurality of transcoded files includes a compressed video file, selecting at least one computer vision system to annotate the compressed video file for searching, transmitting the compressed video file to each computer vision system of the selected at least one computer vision system, and storing a plurality of annotations generated by the selected at least one computer system to a central database in response to transmittal of the compressed video file, wherein each annotation of the plurality of annotations identifies at least one visual characteristic of the compressed video file.

18 Claims, 20 Drawing Sheets

(56) References Cited

U.S. PATENT DOCUMENTS

| | | | |
|---|---|---|---|
| 2002/0069218 A1* | 6/2002 | Sull | G06T 3/4092 |
| | | | 715/202 |
| 2010/0082585 A1* | 4/2010 | Barsook | G06F 3/0482 |
| | | | 707/706 |
| 2011/0093492 A1* | 4/2011 | Sull | G06T 3/4092 |
| | | | 707/769 |
| 2015/0347464 A1* | 12/2015 | Takata | G16H 50/70 |
| | | | 707/728 |
| 2017/0013323 A1* | 1/2017 | Whitney | G06Q 30/0273 |

* cited by examiner

TECHNOLOGIES FOR ANALYZING AND SEARCHING FOR FEATURES IN IMAGE DATA

BACKGROUND

When raw motion footage, still images and audio (collectively, "Assets") are recorded by a camera, the cameras generally capture unprocessed (or minimally processed) data from a camera's image sensor for a high level of detail providing considerable options for image customization and editing of the Assets. The data captured with the Assets can easily constitute several terabytes. After capturing the Assets, the Assets need to be transcoded into a compressed file in order to create a rough edit (e.g., "rough cut") from the vast amounts of Assets captured during a production. The process typically takes a minimum of four hours for every hour of Assets recorded in preparing and transcoding the Assets into a compressed file. Once the Assets have been transcoded to a compressed file, the editors then spend approximately one hour for each hour of Assets recorded logging or tagging the scenes prior to editing. From this logged or tagged information, the editors would select specific scenes in which to assemble the rough cut. For example, if the Assets contain five takes of an actor saying a particular line in a scene, among many other scenes and takes contained in the Assets, the editors would prepare, transcode and tag the Assets (e.g., 20+ hours of footage) to find those specific scenes before assembling a "rough cut."

SUMMARY

One embodiment is directed to a unique system, components, and methods for analyzing and searching for features in image data. Other embodiments are directed to apparatuses, systems, devices, hardware, methods, and combinations thereof for analyzing and searching for features in image data. This summary is not intended to identify key or essential features of the claimed subject matter, nor is it intended to be used as an aid in limiting the scope of the claimed subject matter. Further embodiments, forms, features, and aspects of the present application shall become apparent from the description and figures provided herewith.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION

Figure 1:
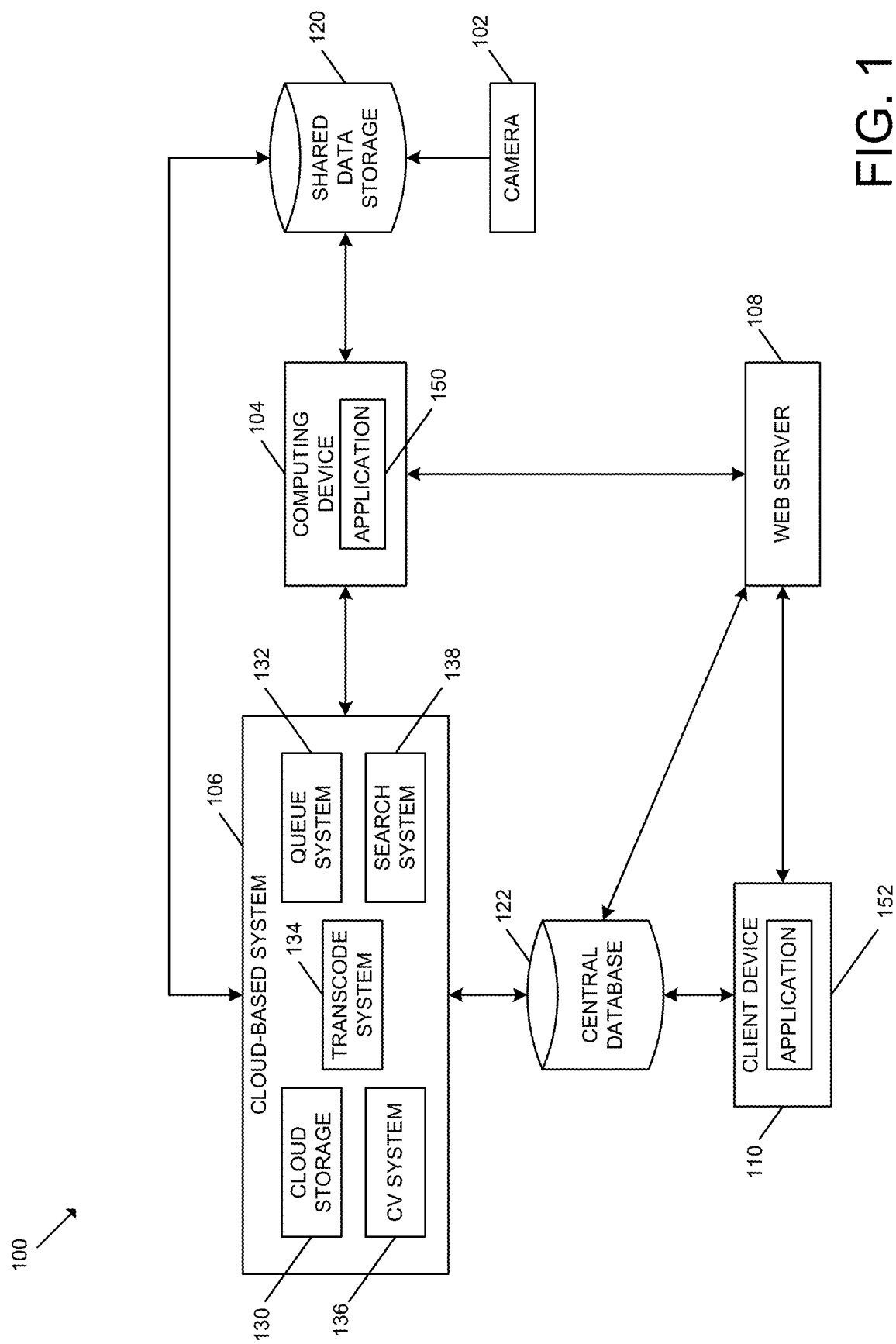
FIG. 1 is a simplified block diagram of at least one embodiment of a system for analyzing and searching for features in image data.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described. Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may not be included or may be combined with other features.

Referring now to FIG. 1, in the illustrative embodiment, a system 100 for analyzing and searching for features in image data includes a camera 102, a computing device 104, a cloud-based system 106, a web server 108, and a client device 110. Additionally, the illustrative system 100 includes shared data storage 120 and a central database 122. Further, as shown in FIG. 1, the illustrative cloud-based system 106 includes cloud storage 130, a queue system 132, a transcode system 134, a computer vision system 136, and a search system 138. Although only one camera 102, one computing device 104, one cloud-based system 106, one web server 108, one client device 110, one shared data storage 120, one central database 122, one cloud storage 130, one queue system 132, one transcode system 134, one computer vision system 136, and one search system 138 are shown in the illustrative embodiment of FIG. 1, the system 100 may include multiple cameras 102, computing devices 104, cloud-based systems 106, web servers 108, client devices 110, shared data storages 120, central databases 122, cloud storages 130, queue systems 132, transcode systems 134, computer vision systems 136, and/or search systems 138 in other embodiments. For example, in some embodiments, multiple cloud-base systems 106 (e.g., related or unrelated systems) may be used to perform the various functions described herein. Further, as described herein, multiple client devices 110 may be used to access, for example, a web-based graphical user interface (e.g., see FIGS. 12-20) that permits the users to search and retrieve various image files.

It should be appreciated that the system 100 and technologies described herein leverage computer vision and artificial intelligence to recognize and distinguish the features and contents of footage captured by cameras. As described in detail below, the system 100 may take raw footage (e.g., straight from a camera 102 on set), which may be several terabytes in data size, convert the raw footage into compressed and actionable image/video files that can be uploaded (e.g., using the transcoding and cloud services features described herein), and analyze the actionable files to generate annotations associated with characteristics/attributes of the footage analyzed. Those results, which may be very technical, may be parsed such that various persons may search for relevant image/file characteristics/attributes using a "natural language" search. Once the various image files are annotated and the results are stored to a searchable database, both studio editors and other parties can easily find image files for further analysis (e.g., to continue generation of the "rip" in the initial studio analysis) and/or to repurpose for another use. As such, the techniques described herein allow the literally thousands of photos of a particular object that occur in a given shoot to be distinguished based on various features of the relevant images and subsequently searched based on those features. As such, the techniques described herein provide technical improvements to the studio analysis of raw image files to the point at which a "rip" is generated while simultaneously providing longevity for the raw image files by virtue of the technical analysis and annotation of those files.

It should be appreciated that the camera 102, the computing device 104, the cloud-based system 106, the web server 108, the client device 110, the shared data storage 120, the central database 122, the cloud storage 130, the queue system 132, the transcode system 134, the computer vision system 136, and/or the search system 138 may be embodied as any type of device/system or collection of devices/systems suitable for performing the functions described herein. More specifically, the camera 102 is embodied as any type of device capable of capturing one or more images discretely or in a stream. For example, in the illustrative embodiment, the camera 102 is configured to capture high resolution video (e.g., "raw" video/images). Further, as indicated above, the camera 102 may be configured to capture the images without color (e.g., in grayscale) in order to capture a high level of detail and to provide further options for image customization. However, in other embodiments, it should be appreciated that camera 102 may be configured to capture video/images with any number of color, depth, and/or other image channels. Without loss of generality, it should be appreciated that the terms "video" and "images" may be used herein interchangeably throughout the description. Although the system 100 depicts the image files captured by the camera 102 as being stored and/or transmitted to the shared data storage 120 for simplicity and brevity of the description, it should be appreciated that the image files may first be stored to a local data storage (e.g., an external hard drive, modular data storage, and/or other local data storage solutions) and then subsequently transferred to the shared data storage (e.g., with and/or without further processing of the raw image files).

Each of the computing device 104 and the client device 110 may be embodied as any type of device capable of executing an application and otherwise performing the functions described herein. For example, in the illustrative embodiment, the computing device 104 is configured to execute an application 150 and the client device 110 is configured to execute an application 152. It should be appreciated that each of the applications 150, 152 may be embodied as any type of application suitable for performing the functions described herein. In particular, in some embodiments, one or more of the applications 150, 152 may be embodied as a mobile application (e.g., a smartphone application), a cloud-based application, a web application, a thin-client application, and/or another type of application. For example, in some embodiments, one or more of the applications 150, 152 may serve as a client-side interface (e.g., via a web browser) for a web-based application or service (e.g., of the web server 108). Additionally, although only one application 150, 152 is shown as being executed by the corresponding devices 104, 110, it should be appreciated that each of the devices 104, 110 may be configured to execute other applications in order to perform the functions described herein. In some embodiments, the application 150 of the computing device 104 may be embodied as a desktop application, and/or the application 152 of the client device 110 may be embodied as a web-based application accessible via the web server 108.

As described herein, in some embodiments, a film studio editor may interact with the computing device 104 via a graphical user interface (GUI) of the application 150 (e.g., the graphical user interface 800 of FIGS. 8-11) in order to upload raw image files (e.g., from shared data storage 120) to the cloud-based system 106 for transcoding, annotating, and/or further analysis as described herein. Further, in some embodiments, a film studio editor and/or other user may interact with the client device 110 via a graphical user interface of the application 152 (e.g., the graphical user interface 1200 of FIGS. 12-20) in order to search among previously transcoded and annotated image files stored in or otherwise identified in the central database 122 as described herein.

The web server 108 may be embodied as any type of device(s) that are capable of serving web pages that form and/or interact with the application 152 of the client device 110 and/or that are capable of otherwise performing the functions described herein. In some embodiments, it should be appreciated that the application 152 may provide a web interface (e.g., in the form of a web browser) to the web server 108 and/or to the central database 122 that allows the user of the client device 110 to search among the images files stored in or otherwise identified in the central database 122 using a "natural language" search.

The cloud-based system 106 may be embodied as any one or more types of devices/systems that are capable of performing the functions described herein. In the illustrative embodiment, the system 106 is embodied as a cloud-based system executing in a cloud computing environment; however, it should be appreciated that, in other embodiments, the system 106 or a portion thereof (e.g., one or more of the cloud storage 130, the queue system 132, the transcode system 134, the computer vision system 136, the search system 138, and/or one or more portions thereof) may be embodied as one or more systems executing outside of a cloud computing environment.

In cloud-based embodiments, one or more of the cloud-based system 106, the cloud storage 130, the queue system 132, the transcode system 134, the computer vision system 136, the search system 138, and/or one or more portions thereof may be embodied as a "serverless" or server-ambiguous computing solution, for example, that executes a plurality of instructions on-demand, contains logic to execute instructions only when prompted by a particular activity/trigger, and does not consume computing resources when not in use. That is, the cloud-based system 106, the cloud storage 130, the queue system 132, the transcode system 134, the computer vision system 136, the search system 138, and/or one or more portions may be embodied as a virtual computing environment residing "on" a computing system (e.g., a distributed network of devices) in which various $3^{rd}$ party virtual functions may be executed corresponding with the functions of the cloud-based system 106, the cloud storage 130, the queue system 132, the transcode system 134, the computer vision system 136, the search system 138, and/or one or more portions described herein. For example, when an event occurs (e.g., data is transferred to the cloud-based system 106 for handling), the virtual computing environment may be communicated with (e.g., via a request to an API of the virtual computing environment), whereby the API may route the request to the correct virtual function (e.g., a particular server-ambiguous computing resource) based on a set of rules. As such, when a request for the transmission of access control data is made (e.g., via an appropriate user interface to the cloud-based system 106), the appropriate virtual function(s) may be executed to perform the actions before eliminating the instance of the virtual function(s).

The cloud storage 130 may be embodied as one or more databases, data structures, and/or data storage devices capable of storing data in the cloud-based system 106 or otherwise facilitating the storage of such data for the cloud-based system 106. For example, in some embodiments, the cloud storage 130 may include one or more cloud storage buckets. In other embodiments, it should be appreciated that the cloud storage 130 may, additionally or alternatively, include other types of cloud storage mechanisms that allow for dynamic scaling of the amount of data storage available to the cloud-based system 106. For example, the cloud storage 130 may include $3^{rd}$ party cloud-based storage.

The queue system 132 may be embodied as any service or system capable of queuing data and/or messages for processing by the cloud-based system 106 and otherwise performing the functions described herein. For example, in some embodiments, the queue system 132 may include a $3^{rd}$ party cloud queue service/system. In other embodiments, it should be appreciated that the queue system 132 may, additionally or alternatively, include other types of systems of queuing data and/or messages for processing by the cloud-based system 106 and/or other devices of the system 100.

The transcode system 134 may be embodied as any service or system capable of transcoding image/video files and otherwise performing the functions described herein. For example, in the illustrative embodiment, the transcode system 134 is configured to convert raw image files into various other formats (e.g., creating different version of the raw image files). In some embodiments, the transcode system 134 may generate different versions of one or more (e.g., each) of the raw image/video files including, for example, compressed versions of the corresponding raw image file in the same/different format, thumbnail images extracted from the raw image files, audio files, and/or other converted files. More specifically, in some embodiments, the transcode system 134 may convert the image/video data (e.g., by generating a new version) to an *.mp4 file, *.mp3 file, and/or thumbnail files (see, for example, blocks 522-526 of FIG. 5).

The computer vision (CV) system 136 may be embodied as any service or system capable of processing raw image/video data captured by the camera 102 and/or transcoded version(s) of the raw data, for example, to ascertain characteristics about the image/video and capable of otherwise performing the functions described herein. In the illustrative embodiment, for example, the computer vision system 136 may determine various characteristics of the objects (e.g., inanimate objects, animate objects, scenes, persons, etc.) contained within the images/video and various features of the identified objects (e.g., the type of object, time at which the object is located, etc.). Further, the computer vision system 136 may generate one or more annotations or tags based on the various objects and/or other features of the images/video, which may be leveraged by the search system 138 as described below. As indicated above, although the computer vision system 136 is described herein as a single system for simplicity and brevity of the description, it should be appreciated that the computer vision system 136 may be embodied as multiple systems in some embodiments. For example, each separate system 136 may utilize different computer vision techniques in the process of generating annotations. In various embodiments, it should be appreciated that the computer vision system 136 may include one or more $3^{rd}$ party artificial intelligence services.

It should be appreciated that the computer vision system 136 may apply various computer vision algorithms, filters, and/or techniques to generate processed versions of the captured images and/or reformatted versions thereof, which may be used (e.g., as intermediate images) in generating the annotations and/or otherwise performing the functions described herein. For example, in some embodiments, the computer vision system 136 may utilize image filters (e.g., kernel-based convolution, masking, etc.), edge detection algorithms (e.g., Canny edge detection, Sobel filters, etc.), image segmentation algorithms (e.g., pyramid segmentation, watershed segmentation, etc.), blob detection algorithms, corner detection algorithms, features identification and/or matching algorithms (e.g., scale-invariant feature transform (SIFT), speeded-up robust features (SURF), etc.), morphological image processing algorithms (e.g., erosion, dilation, opening, closing, etc.), and/or other suitable algorithms useful in performing the functions described herein.

The search system 138 may be embodied as any service or system capable of searching annotations and/or other search-relevant data (e.g., generated by the cloud-based system 106 and/or a system/device thereof) based on search terms provided to the system 138 and capable of otherwise performing the functions described herein. As described herein, in some embodiments, a user may search for certain objects and/or features contained in an image or video based on natural language search terms provided by the user via a graphical user interface (e.g., the graphical user interface 1200) of the application 152 of the client device 110. That is, the search terms may be "natural language" search terms in the sense that they are formulated in a fashion that does or is intended to approximate or simulate speech that normally arises in an unpremeditated fashion as the result of the innate facility for language possessed by the human intellect (as distinguished from, for example, structured computer programming languages or code). In other words, natural language search terms may reflect a description that a user would provide conversationally in natural dialog. For example, a user may search for video of a "smiling old man" using the graphical user interface of the application 152 rather than searching for a "male, 65," which may reflect the output of the computer vision system 136.

It should be further appreciated that the search system 138 may leverage machine learning techniques to perform the functions described herein (e.g., to better translate a user-provided "natural language" search to structured search terms and improve the search results). For example, in some embodiments, the search system 138 may utilize neural network algorithms, regression algorithms, instance-based algorithms, regularization algorithms, decision tree algorithms, Bayesian algorithms, clustering algorithms, association rule learning algorithms, deep learning algorithms, dimensionality reduction algorithms, and/or other suitable machine learning algorithms, techniques, and/or mechanisms.

Each of the shared data storage 120 and the central database 122 may be embodied as any device or component, or collection of devices or components, capable of short-term or long-term storage of data. Although the shared data storage 120 and the central database 122 are described herein as data storages and databases, respectively, it should be appreciated that each of the shared data storage 120 and the central database 122 may include both a database (or other type of organized collection of data and structures) and data storage for the actual storage of the underlying data. The data storage 120 and the central database 122 may store various data useful for performing the functions described herein. As described herein, in some embodiments, the shared data storage 120 may be used to store raw image files (e.g., from the camera 102 directly or indirectly via an intermediate device) and/or one or more processed versions of the image files. For example, the cloud-based system 106 or, more specifically, the transcode system 134 may generate a compressed version of the image files, a color-added version of the image files, and/or another version of the image files that is stored in the shared data storage 120 (e.g., for immediate analysis by studio editors). In some embodiments, the shared data storage 120 may be embodied as a storage area network (SAN). Further, in some embodiments, the central database 122 is configured to store and/or identify the annotated images files (e.g., based on the particular annotations) as described herein.

It should be appreciated that each of the camera 102, the computing device 104, the cloud-based system 106, the web server 108, the client device 110, the shared data storage 120, the central database 122, the cloud storage 130, the queue system 132, the transcode system 134, the computer vision system 136, and/or the search system 138 may be embodied as (or include) one or more computing devices similar to the computing device 200 described below in reference to FIG. 2. For example, in the illustrative embodiment, each of the camera 102, the computing device 104, the cloud-based system 106, the web server 108, the client device 110, the shared data storage 120, the central database 122, the cloud storage 130, the queue system 132, the transcode system 134, the computer vision system 136, and/or the search system 138 may include a processing device 202 and a memory 206 having stored thereon operating logic 208 (e.g., a plurality of instructions) for execution by the processing device 202 for operation of the corresponding device.

Figure 2:
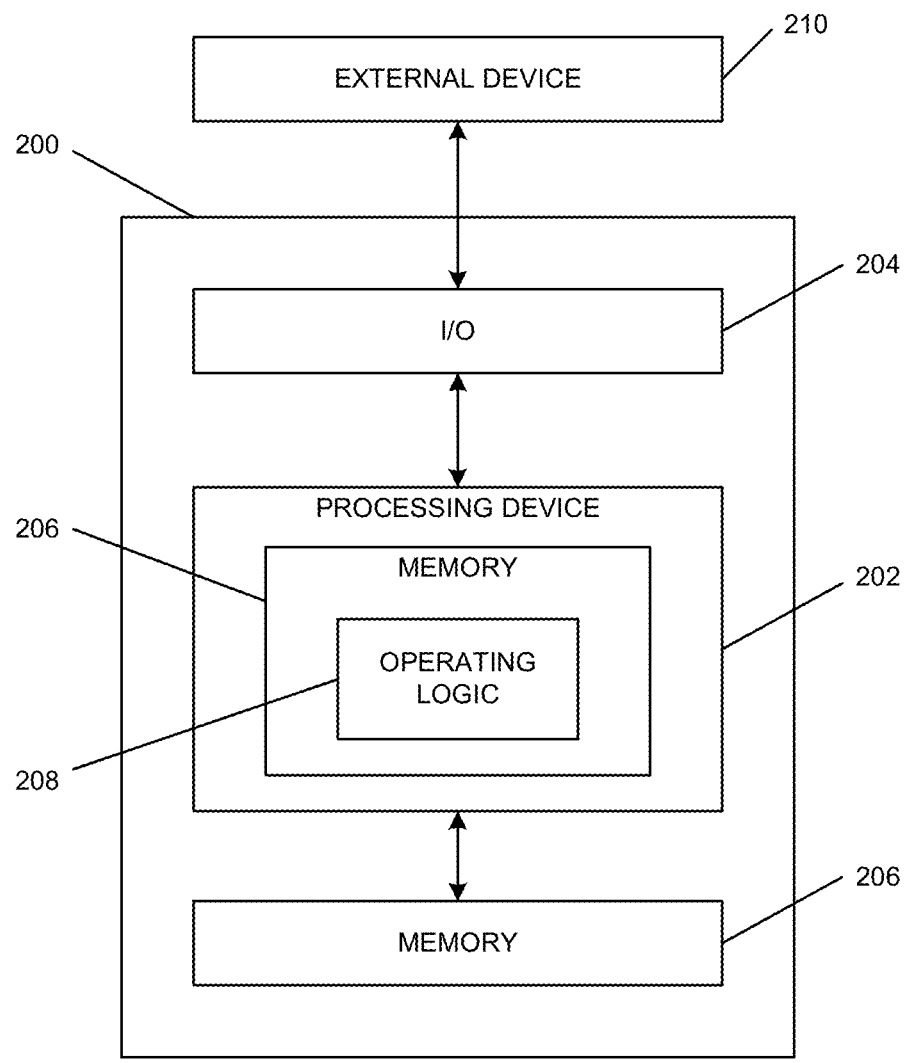
FIG. 2 is a simplified block diagram of at least one embodiment of a computing device.

Referring now to FIG. 2, a simplified block diagram of at least one embodiment of a computing device 200 is shown. The illustrative computing device 200 depicts at least one embodiment of a camera, computing device, cloud-based system, web server, client device, shared data storage, central database, cloud storage, queue system, transcode system, computer vision system, and/or search system that may be utilized in connection with the camera 102, the computing device 104, the cloud-based system 106, the web server 108, the client device 110, the shared data storage 120, the central database 122, the cloud storage 130, the queue system 132, the transcode system 134, the computer vision system 136, and/or the search system 138 illustrated in FIG. 1. Depending on the particular embodiment, the computing device 200 may be embodied as a server, desktop computer, laptop computer, tablet computer, notebook, netbook, Ultrabook™, cellular phone, mobile computing device, smartphone, wearable computing device, personal digital assistant, Internet of Things (IoT) device, processing system, wireless access point, router, gateway, camera device, and/or any other computing, processing, and/or communication device capable of performing the functions described herein.

The computing device 200 includes a processing device 202 that executes algorithms and/or processes data in accordance with operating logic 208, an input/output device 204 that enables communication between the computing device 200 and one or more external devices 210, and memory 206 which stores, for example, data received from the external device 210 via the input/output device 204.

The input/output device 204 allows the computing device 200 to communicate with the external device 210. For example, the input/output device 204 may include a transceiver, a network adapter, a network card, an interface, one or more communication ports (e.g., a USB port, serial port, parallel port, an analog port, a digital port, VGA, DVI, HDMI, FireWire, CAT 5, or any other type of communication port or interface), and/or other communication circuitry. Communication circuitry of the computing device 200 may be configured to use any one or more communication technologies (e.g., wireless or wired communications) and associated protocols (e.g., Ethernet, Bluetooth®, Wi-Fi®, WiMAX, etc.) to effect such communication depending on the particular computing device 200. The input/output device 204 may include hardware, software, and/or firmware suitable for performing the techniques described herein.

The external device 210 may be any type of device that allows data to be inputted or outputted from the computing device 200. For example, in various embodiments, the external device 210 may be embodied as the camera 102, the computing device 104, the cloud-based system 106, the web server 108, the client device 110, the shared data storage 120, the central database 122, the cloud storage 130, the queue system 132, the transcode system 134, the computer vision system 136, and/or the search system 138. Further, in some embodiments, the external device 210 may be embodied as another computing device, switch, diagnostic tool, controller, printer, display, alarm, peripheral device (e.g., keyboard, mouse, touch screen display, etc.), and/or any other computing, processing, and/or communication device capable of performing the functions described herein. Furthermore, in some embodiments, it should be appreciated that the external device 210 may be integrated into the computing device 200.

The processing device 202 may be embodied as any type of processor(s) capable of performing the functions described herein. In particular, the processing device 202 may be embodied as one or more single or multi-core processors, microcontrollers, or other processor or processing/controlling circuits. For example, in some embodiments, the processing device 202 may include or be embodied as an arithmetic logic unit (ALU), central processing unit (CPU), digital signal processor (DSP), and/or another suitable processor(s). The processing device 202 may be a programmable type, a dedicated hardwired state machine, or a combination thereof. Processing devices 202 with multiple processing units may utilize distributed, pipelined, and/or parallel processing in various embodiments. Further, the processing device 202 may be dedicated to performance of just the operations described herein, or may be utilized in one or more additional applications. In the illustrative embodiment, the processing device 202 is programmable and executes algorithms and/or processes data in accordance with operating logic 208 as defined by programming instructions (such as software or firmware) stored in memory 206. Additionally or alternatively, the operating logic 208 for processing device 202 may be at least partially defined by hardwired logic or other hardware. Further, the processing device 202 may include one or more components of any type suitable to process the signals received from input/output device 204 or from other components or devices and to provide desired output signals. Such components may include digital circuitry, analog circuitry, or a combination thereof.

The memory 206 may be of one or more types of non-transitory computer-readable media, such as a solid-state memory, electromagnetic memory, optical memory, or a combination thereof. Furthermore, the memory 206 may be volatile and/or nonvolatile and, in some embodiments, some or all of the memory 206 may be of a portable type, such as a disk, tape, memory stick, cartridge, and/or other suitable portable memory. In operation, the memory 206 may store various data and software used during operation of the computing device 200 such as operating systems, applications, programs, libraries, and drivers. It should be appreciated that the memory 206 may store data that is manipulated by the operating logic 208 of processing device 202, such as, for example, data representative of signals received from and/or sent to the input/output device 204 in addition to or in lieu of storing programming instructions defining operating logic 208. As shown in FIG. 2, the memory 206 may be included with the processing device 202 and/or coupled to the processing device 202 depending on the particular embodiment. For example, in some embodiments, the processing device 202, the memory 206, and/or other components of the computing device 200 may form a portion of a system-on-a-chip (SoC) and be incorporated on a single integrated circuit chip.

In some embodiments, various components of the computing device 200 (e.g., the processing device 202 and the memory 206) may be communicatively coupled via an input/output subsystem, which may be embodied as circuitry and/or components to facilitate input/output operations with the processing device 202, the memory 206, and other components of the computing device 200. For example, the input/output subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations.

The computing device 200 may include other or additional components, such as those commonly found in a typical computing device (e.g., various input/output devices and/or other components), in other embodiments. It should be further appreciated that one or more of the components of the computing device 200 described herein may be distributed across multiple computing devices. In other words, the techniques described herein may be employed by a computing system that includes one or more computing devices. Additionally, although only a single processing device 202, I/O device 204, and memory 206 are illustratively shown in FIG. 2, it should be appreciated that a particular computing device 200 may include multiple processing devices 202, I/O devices 204, and/or memories 206 in other embodiments. Further, in some embodiments, more than one external device 210 may be in communication with the computing device 200.

Figure 3:
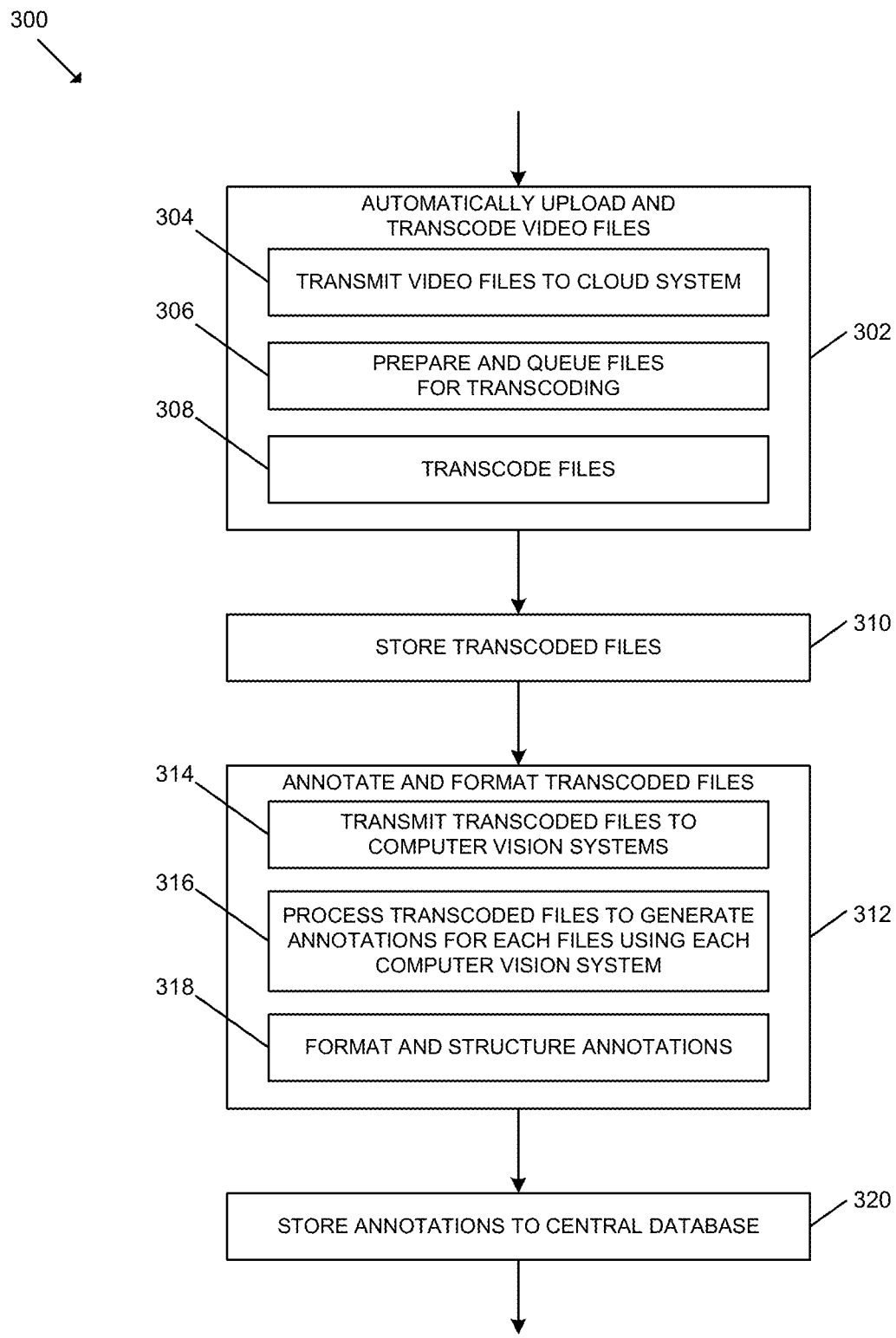
FIG. 3 is a simplified flow diagram of at least one embodiment of a method for annotating image data using the system of FIG. 1.

Referring now to FIG. 3, in use, the system 100 may execute a method 300 for annotating image data. It should be appreciated that the particular blocks of the method 300 are illustrated by way of example, and such blocks may be combined or divided, added or removed, and/or reordered in whole or in part depending on the particular embodiment, unless stated to the contrary. Further, it should be appreciated that the method 300 of FIG. 3 may generally correspond with blocks 502-542 of the method 500 of FIGS. 5-7 in some embodiments.

The illustrative method 300 begins with block 302 in which the system 100 automatically uploads and transcodes one or more video files. In particular, in block 304, the system 100 may transmit one or more video files to the cloud-based system 106 and, in block 306, the system 100 (e.g., via the queue system 132) may prepare and queue files for transcoding. In block 308, the system 100 transcodes the queued files (e.g., as the corresponding files are "pulled" from the queue). For example, in some embodiments, a user of the computing device 104 may use the application 150 to select particular video files (e.g., raw image/video files) to upload to the cloud storage 130 from the shared data storage 120 and queue for processing via the queue system 132. In some embodiments, the application 150 may include a graphical user interface such as the graphical user interface 800 of FIGS. 8-11 in order to automatically upload files for transcoding as described below. In other embodiments, it should be appreciated that the image/video files may be otherwise automatically uploaded and transcoded (e.g., without any user interaction).

Further, it should be appreciated that the number and/or type of transcoded files may vary depending on the particular embodiment. For example, the system 100 may generate different versions of one or more of the raw image/video files including, for example, compressed versions of the corresponding raw image file in the same/different format, thumbnail images extracted from the raw image files, audio files, and/or other converted files. In particular, in the embodiment of FIGS. 5-7, the transcoding involves generating a *.mp4 file, *.mp3 file, and/or thumbnail files (see, for example, blocks 520-526 of FIG. 5). It should be further appreciated that the transcoding may also involve adding color that was absent in the raw image/video files.

In block 310, the system 100 stores one or more transcoded files. For example, in some embodiments, one or more of the transcoded files may be stored to the shared data storage 120 or another local data storage. In particular, in the illustrative embodiment, a compressed version of the raw image/video file (e.g., a *.mp4 formatted version of the file) may be stored in the shared data storage 120, the central database 112, cloud storage, and/or another suitable storage location in order to permit studio editors to immediately begin analyzing the footage to assemble a "rip." Further, in some embodiments, an uncompressed version of the raw image/video file (e.g., a *.mov formatted version of the file) may be stored in the shared data storage 120, the central database 112, cloud storage, and/or another suitable storage location. Accordingly, in such embodiments, at least the initial studio editor analysis of an image/video file may begin prior to or contemporaneously with the further analysis of the images/video file.

In block 312, the system 100 annotates and formats the transcoded files. In particular, in block 314, the system 100 transmits the transcoded files to one or more computer vision systems 136 (e.g., a set of systems 136 selected by a user). In block 316, the system 100 processes the transcoded files to generate annotations for reach of the files using the computer vision systems 136 (e.g., each selected system 136). In block 318, the system 100 formats and structures the annotations and, in block 320, the system 100 stores the annotations to the central database 122 for subsequent searching as described herein.

For example, in some embodiments, a user (e.g., studio editor) may use a graphical user interface such as the graphical user interface 800 of FIGS. 8-11 to select one or more computer vision systems 136 to analyze one or more transcoded files (e.g., the compressed image/video files) to generate corresponding annotations that may be used for subsequently searching through the image/video files. As described herein, each of the annotations may identify one or more characteristics (e.g., visual characteristics) of the transcoded file and thereby identify such characteristics of the raw file. For example, each of the computer vision systems 136 may determine various characteristics of the objects (e.g., inanimate objects, animate objects, scenes, persons, etc.) contained within the images/video and various features of the identified objects (e.g., the type of object, time at which the object is located, etc.) and generate corresponding annotations reflecting the identified features. It should be appreciated that the various computer vision systems 136 may generate different annotations and/or present those annotations in a different format, for example, even when analyzing the same image or scene.

Although the blocks 302-320 are described in a relatively serial manner, it should be appreciated that various blocks of the method 300 may be performed in parallel in some embodiments.

Figure 4:
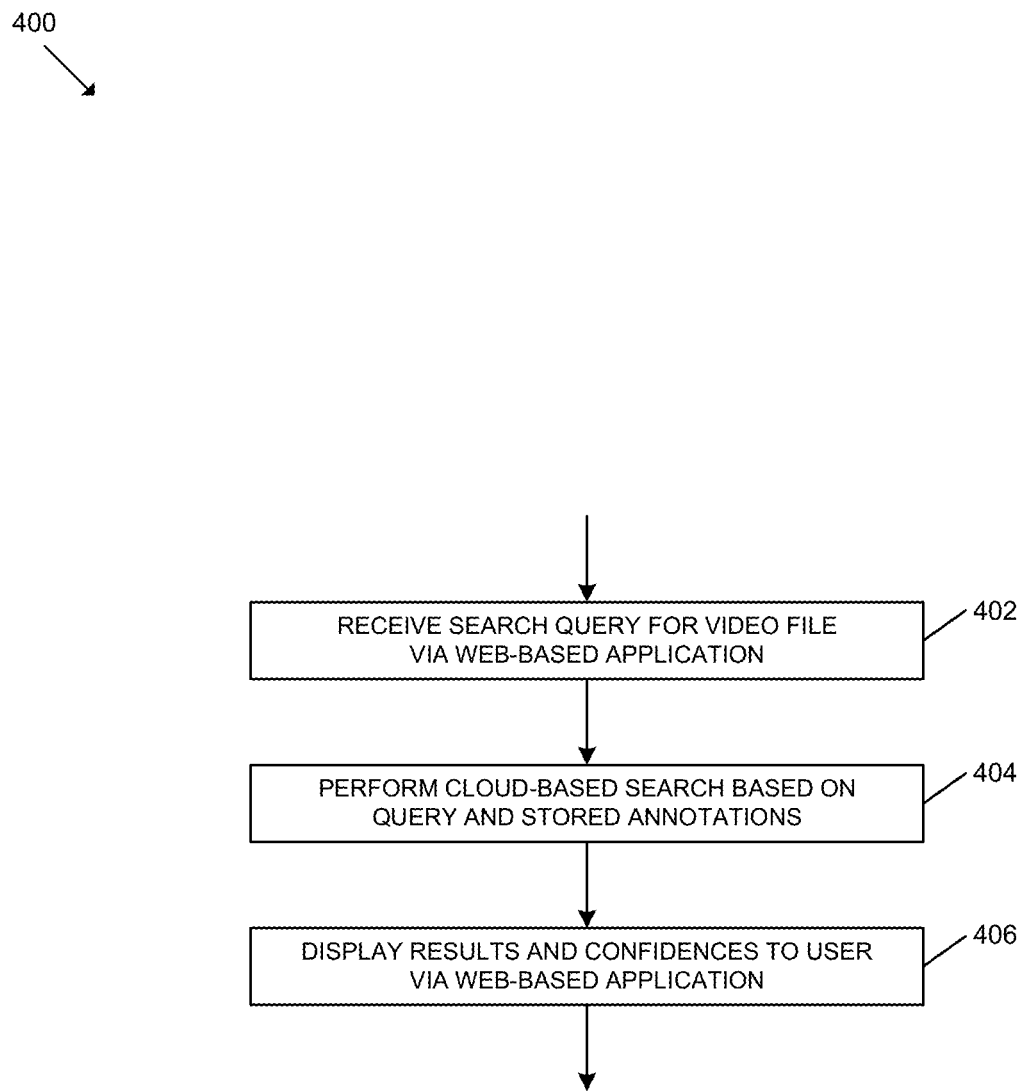
FIG. 4 is a simplified flow diagram of at least one embodiment of a method for searching annotated image data using the system of FIG. 1.

Referring now to FIG. 4, in use, the system 100 may execute a method 400 for searching annotated image data. It should be appreciated that the particular blocks of the method 400 are illustrated by way of example, and such blocks may be combined or divided, added or removed, and/or reordered in whole or in part depending on the particular embodiment, unless stated to the contrary. Further, it should be appreciated that the method 400 of FIG. 4 may generally correspond with blocks 544-554 of the method 500 of FIGS. 5-7 in some embodiments.

The illustrative method 400 begins with block 402 in which the system 100 receives a search query for an image/video file via a web-based application (e.g., the application 152). For example, in some embodiments, a user may use a graphical user interface such as the graphical user interface 1200 of FIGS. 12-20 to provide the relevant search terms. As described herein, it should be appreciated that the search terms may be provided as "natural language" search terms rather than structured search terms. It should be appreciated that the search query may be instructing the system 100 to search for transcoded and analyzed image/video data that has at least one image or video frame having a particular desired characteristic. For example, the user may be interested in identifying whether various image/video files include at least one image frame having a "smiling old man" or other suitable search target and, if so, the time frame within the image/video files at which the image frame(s) can be found.

In block 404, the system 100 performs a cloud-based search based on the search query and the annotations stored in the central database 122 associated with the analyzed image/video files. As described herein, the system 100 may translate "natural language" search terms into structured search terms suitable for comparison against the central database 122. Further, in doing so, the system 100 or, more specifically, the search system 138 may leverage one or more machine learning algorithms to improve search results as described herein.

In block 406, the system 100 displays the results of the search and associated confidences to the user via the web-based application (e.g., the application 152). For example, in some embodiments, the results may be displayed in a graphical user interface similar to the graphical user interface 1200 of FIGS. 12-20. As such, in some embodiments, the results may be displayed as a set of thumbnail images corresponding with various image/video files or, more specifically, particular frames within such image/video files that include (or have a high confidence of including) the target feature(s). In some embodiments, the user may select a particular thumbnail image to reveal additional information regarding the corresponding image/video file or frame such as, for example, the level of confidence that the system has in the image/video file or frame matching various terms. Further, in some embodiments, the user's selection of a particular thumbnail image may retrieve the corresponding image/video file (e.g., the corresponding raw image file) from the central database 122, the shared data storage 120, and/or another relevant storage location.

Although the blocks 402-406 are described in a relatively serial manner, it should be appreciated that various blocks of the method 400 may be performed in parallel in some embodiments.

Figure 5:
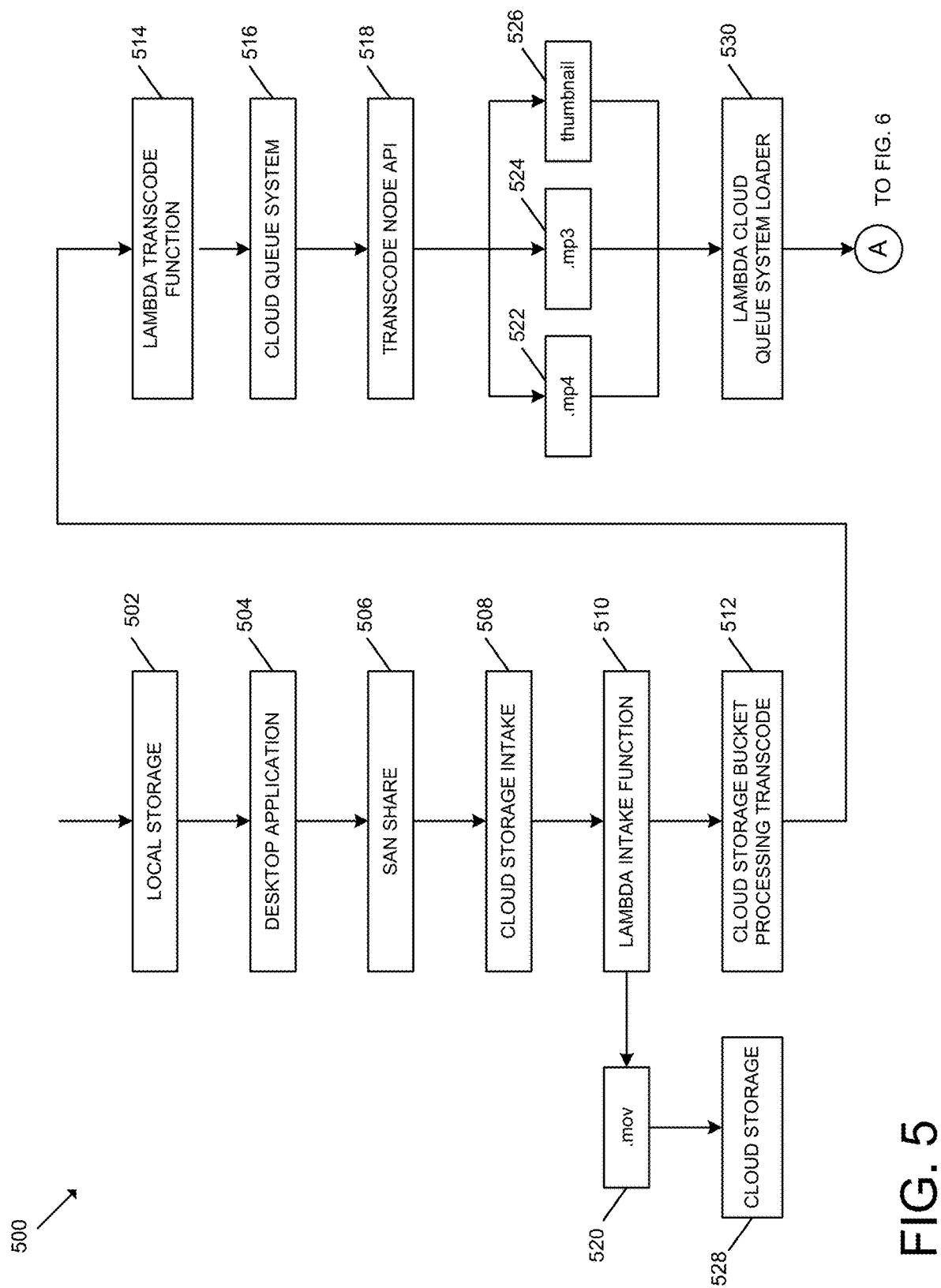
FIGS. 5-7 are a simplified block diagram of at least one embodiment of a method for analyzing and searching for features in image data.
Figure 6:
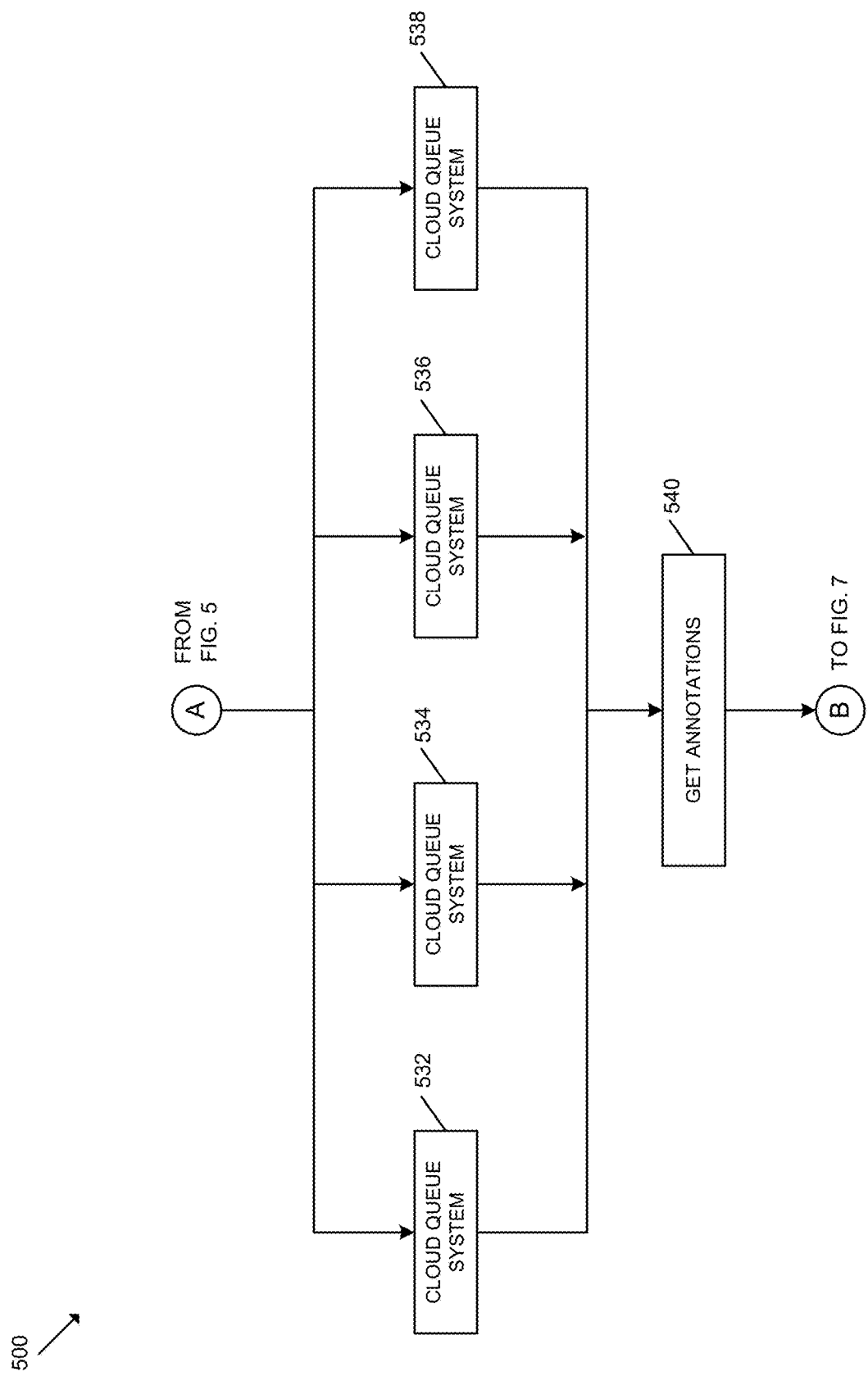
Figure 7:
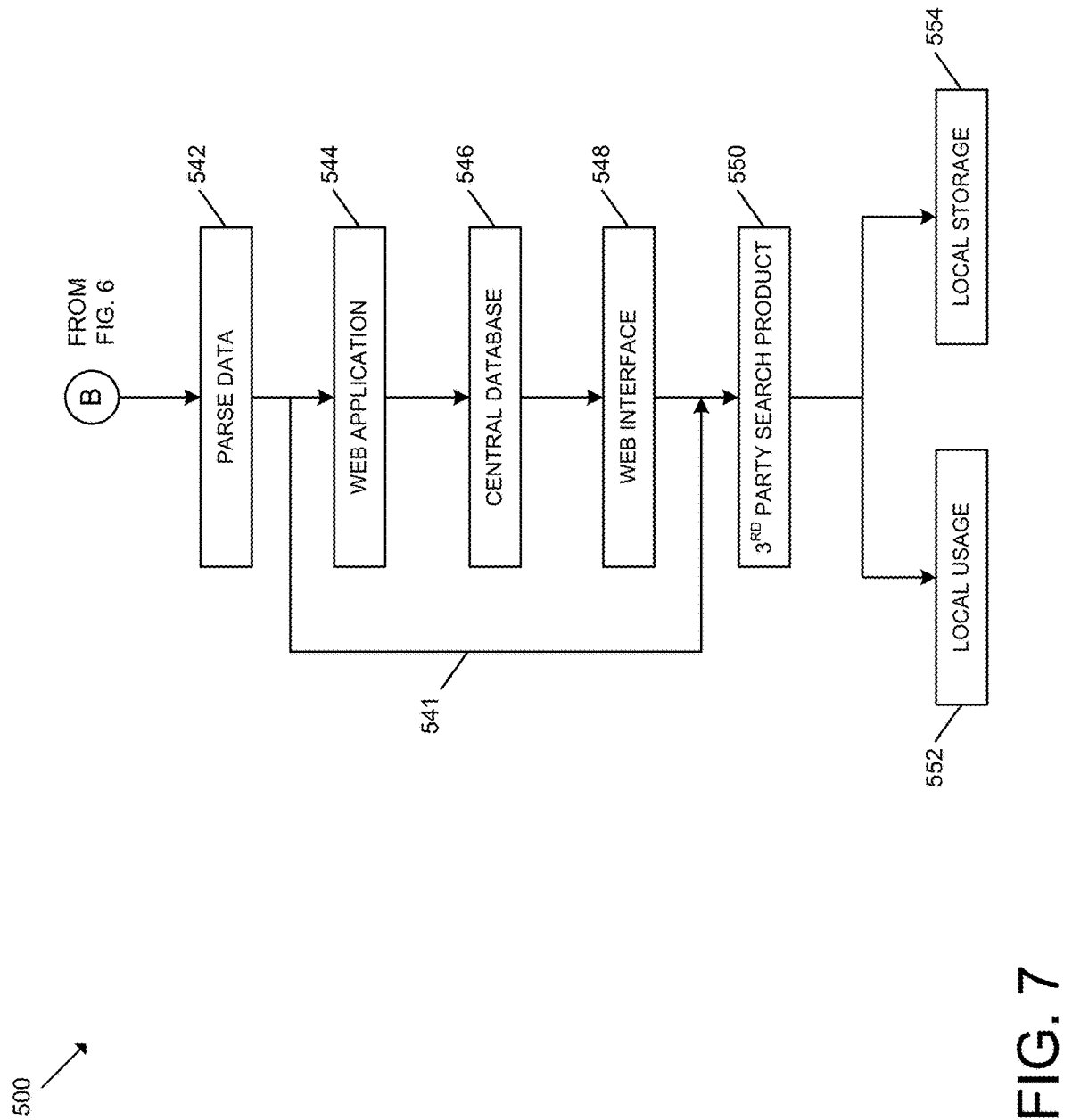

Referring now to FIGS. 5-7, in use, the system 100 may execute a method 500 for analyzing and searching for features in image data. It should be appreciated that the particular blocks of the method 500 are illustrated by way of example, and such blocks may be combined or divided, added or removed, and/or reordered in whole or in part depending on the particular embodiment, unless stated to the contrary. The illustrative method 500 begins with blocks 502-504 in which a user (e.g., a studio editor) uploads a video (e.g., a raw image/video file) through local storage (e.g., the shared data storage 120) and/or a desktop application (e.g., the application 150 of the computing device 104). For example, the video may be uploaded to the cloud storage 130 as described above. In some embodiments, the desktop application may execute a standalone application 150 or process that uploads a local folder (or files) to a cloud-based service. It should be appreciated that the video file may be uploaded using a graphical user interface similar to the graphical user interface 800 of FIGS. 8-11 in some embodiments.

Figure 8:
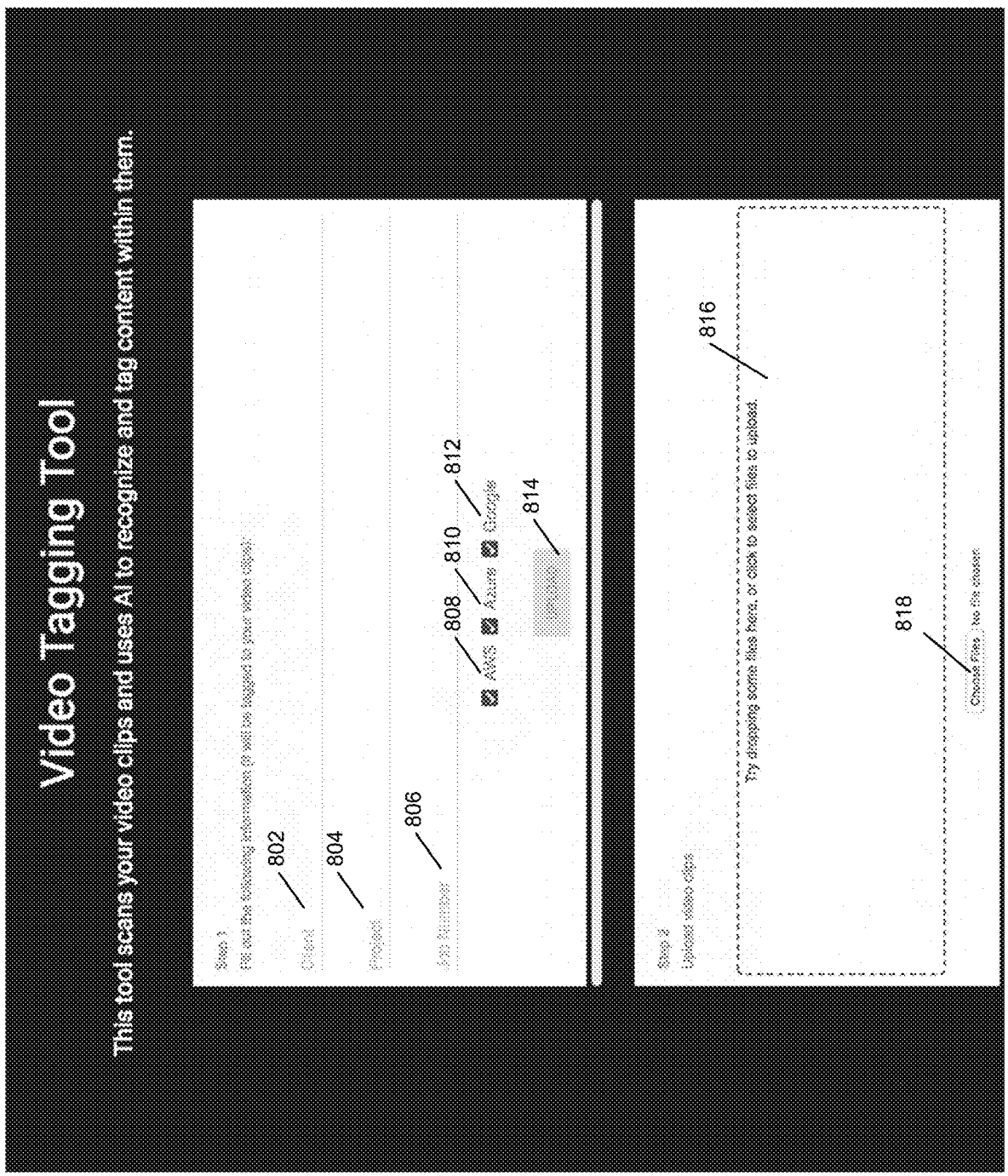
FIGS. 8-11 illustrate various states of at least one embodiment of a graphical user interface of an application executed by the system of FIG. 1.
Figure 9:
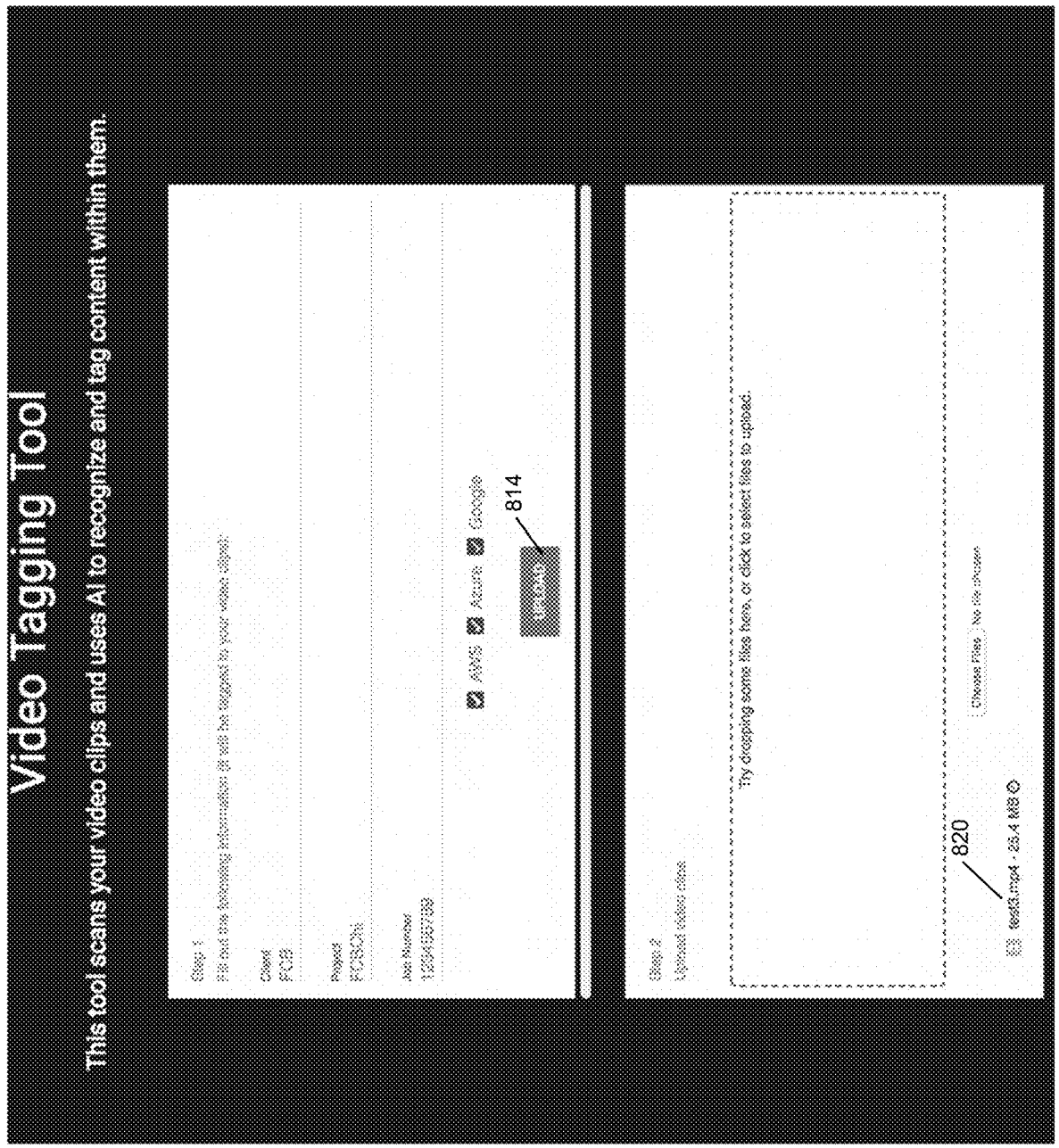
Figure 10:
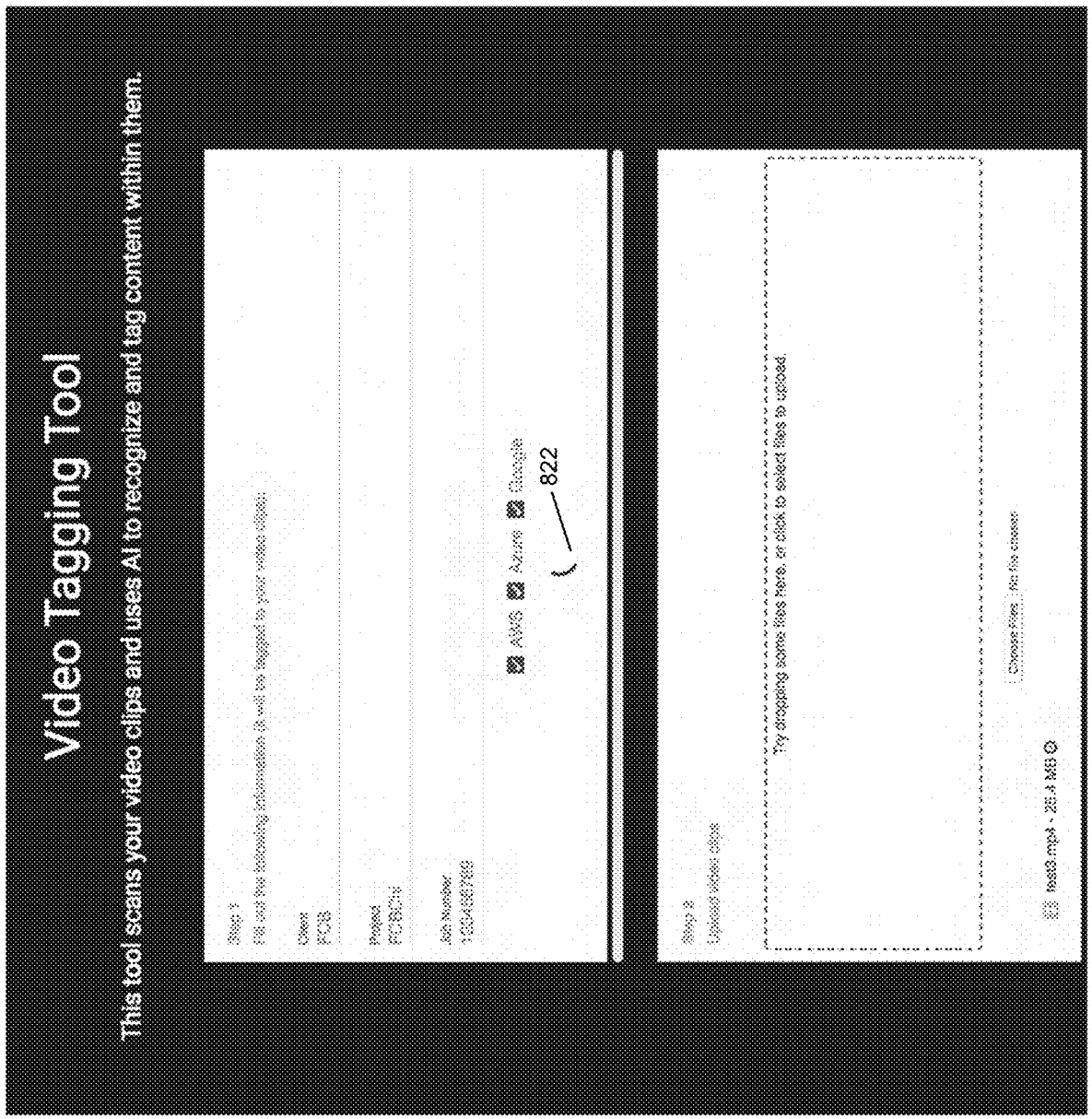
Figure 11:
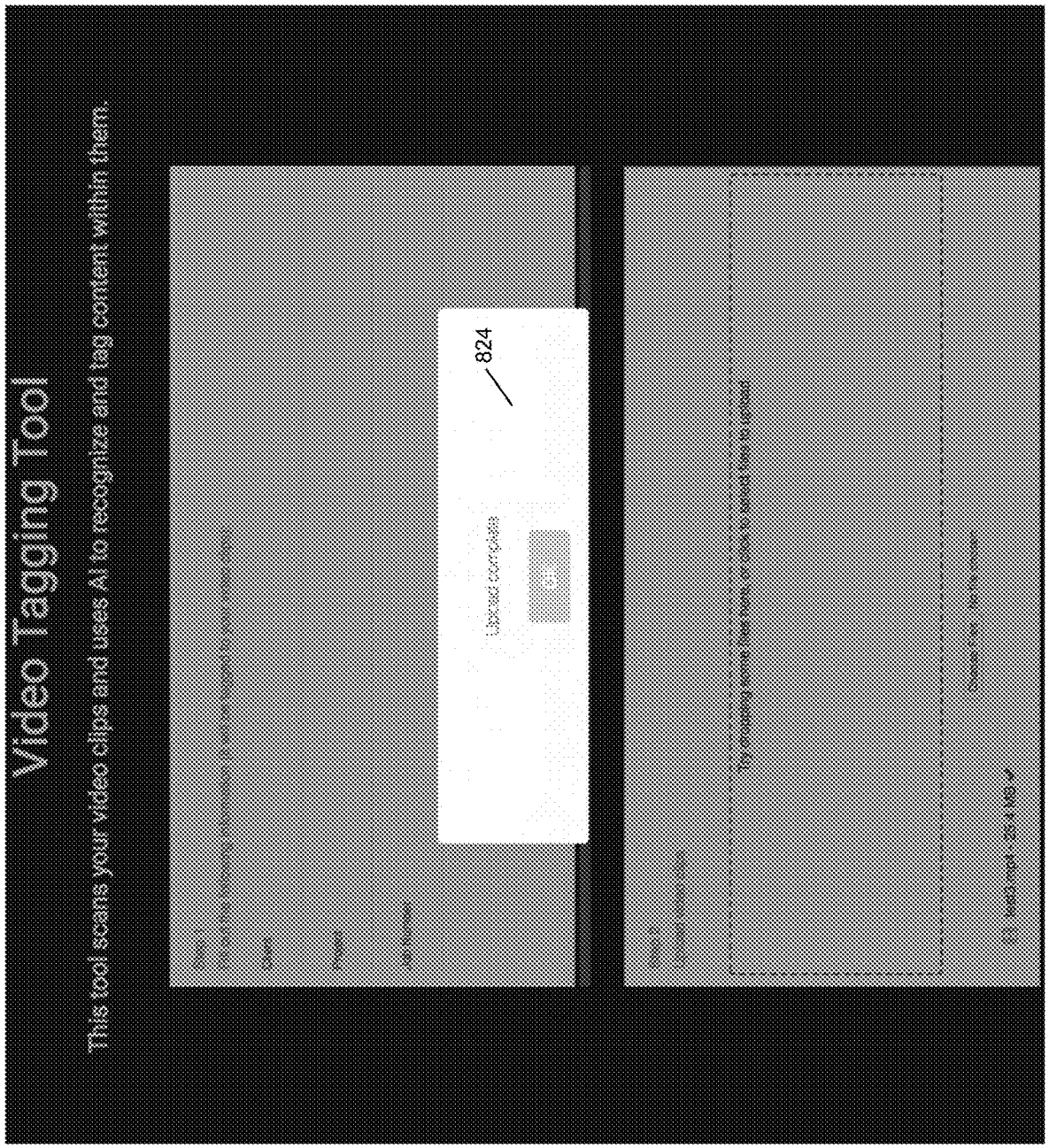

FIGS. 8-11 illustrate various possible states of the graphical user interface 800 as an image/video file is uploaded by the user. In particular, FIG. 8 illustrates the graphical user interface 800 when it is initially presented to the user, FIG. 9 illustrates the graphical user interface 800 after the user has identified a file to be uploaded but prior to performing the upload, FIG. 10 illustrates the graphical user interface 800 when the upload is in progress, and FIG. 11 illustrates the graphical user interface 800 after the upload is completed.

As shown in FIG. 8, the illustrative graphical user interface 800 includes multiple fields and buttons including a client field 802, a project field 804, a job number field 806, a first computer vision system checkbox 808, a second computer vision system checkbox 810, a third computer vision system checkbox 812, an upload button 814, a file drop box 816, and a file selection button 818. In the illustrative embodiment, the client field 802 allows the user to label a relevant client, for example, to which the files belong, and the project field 804 and job number 806 may be used to identify the relevant project and job, respectively. However, it should be appreciated that the graphical user interface 800 may list additional or alternative text fields in other embodiments.

The illustrative graphical user interface 800 further includes three computer vision system checkboxes 808, 810, 812, which allow the user to select whether or not each of the three identified computer vision systems 136 is to be used to analyze and therefore annotate the uploaded file(s). In the illustrative embodiment, the computer vision system checkbox 808 corresponds with a $3^{rd}$ party artificial intelligence system, the computer vision system checkbox 810 corresponds with a separate and different $3^{rd}$ party artificial intelligence system, and the computer vision system checkbox 812 corresponds with a third separate and different $3^{rd}$ party artificial intelligence system. However, it should be appreciated that the graphical user interface 800 may identify alternative computer vision systems 136 in other embodiments (e.g., associated with different systems 136 utilized by the system 100). Similar, in some embodiments, the graphical user interface 800 may identify a different number of computer vision systems 136 that may be selected by the user.

In the illustrative embodiment, the upload button 814 of the graphical user interface 800 is depicted in phantom in FIG. 8 as no file has been selected to be uploaded. The file drop box 816 allows the user to "drag and drop" one or more image/video files into the dashed box to identify those files to be uploaded for analysis. Alternatively, the file selection button 818 allows the user to search the user's file directory to identify the files to be uploaded for analysis.

As shown in FIG. 9, after the user has identified a file to be uploaded, the upload button 814 is activated (i.e., no longer phantom) and the file name 820 is identified in the illustrative graphical user interface 800. After the user clicks the upload button 814 to being uploading the identified file(s), the illustrative graphical user interface 800 replaces the upload button 814 with a progress icon 822 that indicates the progress of the file upload or otherwise indicates that the upload is in progress as shown in FIG. 10. When the upload is completed, as shown in FIG. 11, the illustrative graphical user interface 800 displays an upload complete dialog 824 indicated so.

Referring back to FIG. 5, in the illustrative embodiment, the uploaded video file is placed in a cloud storage intake bucket (see block 508) from the Storage Area Network (SAN) or shared data storage 120 (see block 506), which triggers a Lambda intake function in block 510. It should be appreciated that, in some embodiments, the Lambda intake function (see block 510) may output a *.mov file that is stored to cloud storage in block 528 (e.g., the central database 122). In some embodiments, the *.mov file may have been originally generated and/or retrieved by the desktop application (see block 504). It should be appreciated that, in some embodiments, the *.mov file may allow the studio editors to use that file and begin editing without performing color correction in a first pass.

In the illustrative embodiment, the Lambda intake function creates an item within a database (e.g., the central database 122) with the following fields: Client, Project, Job Code, and Date. It should be appreciated, however, that the item may include additional or alternative fields in other embodiments. The illustrative Lambda intake function is triggered when a file enters the S3 intake bucket, the file data to populate those fields (e.g., Client, Project, Job Code, and Date) is retrieved from the file's cloud storage key, and the item is created in the central database 122 with those field parameters. Additionally, in some embodiments, the file is renamed to coincide with an item identifier returned by the central database 122 (e.g., to standardize the file name), and the file is copied to a storage folder (e.g., cloud:/storage/media) and moved to a transcode folder (e.g., cloud:/processing/transcode). Further, the file may be added to the central database 122 and the item status may be updated in the central database 122 to indicate that the intake is complete.

It should be appreciated that the transcode folder may be another cloud storage bucket such that when the file is moved to the transcode folder (see block 512), it triggers a Lambda transcode function in block 514. The illustrative Lambda transcode function is triggered when a file enters the cloud storage transcode bucket. When triggered, the Lambda transcode function determines the item identifier from the filename, retrieves the relevant item data from the central database 122, and creates a cloud queue service item with the item identifier, filename, and item type (e.g., video or image). Further, the function may update the item status in the central database 122 to indicate that the item has been sent to the transcoder. It should be appreciated that the cloud queue service in block 516 queues the files to be transcoded.

In block 518, the transcode node application (e.g., the transcode system 134) processes the image/video file from the queue, creating one or more compressed copies of the original file, one or more thumbnail images from the original file, and/or an audio file based on or associated with the original file. More specifically, in the illustrative embodiment, the transcode application polls the cloud queue service queue for items to be processed and retrieves the next file to be processed in the queue. Further, the illustrative transcode application creates a compressed and resized image/video file that is stored to an cloud storage bucket (e.g., cloud:/processing/sqs), creates one or more thumbnail images from the image/video that are stored to another cloud storage bucket (e.g., cloud:/processing/thumbnails). For example, in some embodiments, a plurality of thumbnail images (e.g., 10 thumbnail images) may be generated for a video, whereas a single thumbnail image may be generated for a static image. Additionally, the transcode application may further create an audio file (e.g., a *.mp3 audio file) that is stored to another cloud storage bucket (e.g., cloud:/processing/audio). In other words, in the illustrative embodiment, the transcode node application outputs three different versions of a video file. In particular, the transcode node application may create a *.mp4 file (see block 522), a *.mp3 file (see block 524), and thumbnail images (see block 526). As described herein, it should be appreciated that the thumbnail images may be used to search for various images/videos to conserve data storage space.

In block 530, the Lambda cloud queue system loader loads the compressed files into a queue to be processed by the selected computer vision systems 136. In particular, the illustrative Lambda cloud queue system loader function is triggered when a file enters the cloud storage "sqs" bucket (e.g., cloud:/processing/sqs). When triggered, the file is copied to a storage folder (e.g., cloud:/storage/media), the loader function updates the item status in the central database 122 to indicate that the transcoder is complete. Further, the illustrative cloud queue system loader function creates a cloud queue system item with the item identifier, the filename, and the file location, and it updates the item status in the central database 122 to indicate that the item has been sent to the queue (e.g., "sent to cloud queue system").

It should be appreciated that once the transcoding is completed, there is a ticket in the cloud queue system for each of the computer vision system 136 APIs that are being used (e.g., that were selected by the user via the graphical user interface 800 of FIGS. 8-11) as depicted by blocks 532-538 of FIG. 6. In the illustrative embodiment, FIG. 6 depicts four different computer vision and transcription systems 136 and the corresponding processes for generating annotations and providing them to the system 100. In particular, in some embodiments, a first $3^{rd}$ party artificial intelligence system, a second $3^{rd}$ party artificial intelligence system, a $3^{rd}$ party artificial intelligence system, and/or a fourth $3^{rd}$ party artificial intelligence system may be used to generate annotations. For example, in some embodiments, the system 100 may utilize the Microsoft Azure Video Indexer, the Google Video Intelligence system, the AWS Rekognition system, the AWS Transcribe system, and/or other artificial intelligence systems.

As described herein, it should be appreciated that each of those systems 136 may generate, for example, frame-by-frame annotations that identify various characteristics of the underlying file. With the returned data, the system 100 organizes and structures the data such that it may be stored in the central database 122, which allows other services to consume the data. In particular, in the illustrative embodiment, the system 100 may poll the cloud queue system queues and wait until a ticket is received, process the ticket and retrieve an item identifier from the ticket, use the item identifier to generate a link to the video that was uploaded, and use the generated link to submit the video to various APIs of the computer vision systems 136 for annotation.

In blocks 540 of FIG. 5 and 542 of FIG. 6, the system 100 gets the annotations from the corresponding computer vision systems 136 and parses the data. Further, it should be appreciated that structure and formatted may be added to the returned annotations for entry into the central database 122 (e.g., directly or via the web application as depicted in reference to block 544), thereby making the data usable for consumption by various web services. In some embodiments, parsing the data may involve leveraging various machine learning algorithms as described herein. Additionally, in some embodiments, the parsed data may be provided to or otherwise be made available to (see flow 541) the $3^{rd}$ party search product (see block 550). It should be further appreciated that the auto-transcription data, annotations from the computer vision systems 136, keywords, metadata, and/or other relevant data may be provided to or otherwise be made available to the $3^{rd}$ party search product in some embodiments.

In block 544, the web application (e.g., the application 152) provides the user with the ability to search (e.g., with filters), view, and download various annotated images/videos. Further, in the illustrative embodiment, the web application interfaces with the central database 122 (see block 546), and with the $3^{rd}$ party search product (see block 550) via corresponding APIs. In some embodiments, the web application also organizes video data for download into a third party application (e.g., video editing application), for example, via a web plug-in or extension.

In the illustrative embodiment the central database 122 may serve as a centralized reference for every image/video file and perform asset management functions. It should be appreciated that the web application uses the central database 122 to post the video annotations and display them in a format that can be utilized by the end user. Further, in some embodiments, custom and proprietary queries and mutations may be utilized based on the specific environment and requirements. It should be further appreciated that the central database 122 may have a web interface (see block 548) with the $3^{rd}$ party search product (see block 550). Further, data retrieved from the central database 122 by virtue of a search may be used locally 552 and/or stored locally 554. For example, in some embodiments, the user may download a particular video and a corresponding XML file that includes the relevant annotations. More specifically, in some embodiments, the XML file may be used to incorporate those annotations into the video file within, for example, a video editing application.

It should be appreciated that the user may search, view, and download various annotated images/videos using a graphical user interface similar to the graphical user interface 1200 of FIGS. 12-20 in some embodiments. FIGS. 12-20 illustrate various possible states of the graphical user interface 1200 as the user searches for, views, and/or downloads various annotated images/videos through the web application.

Figure 12:
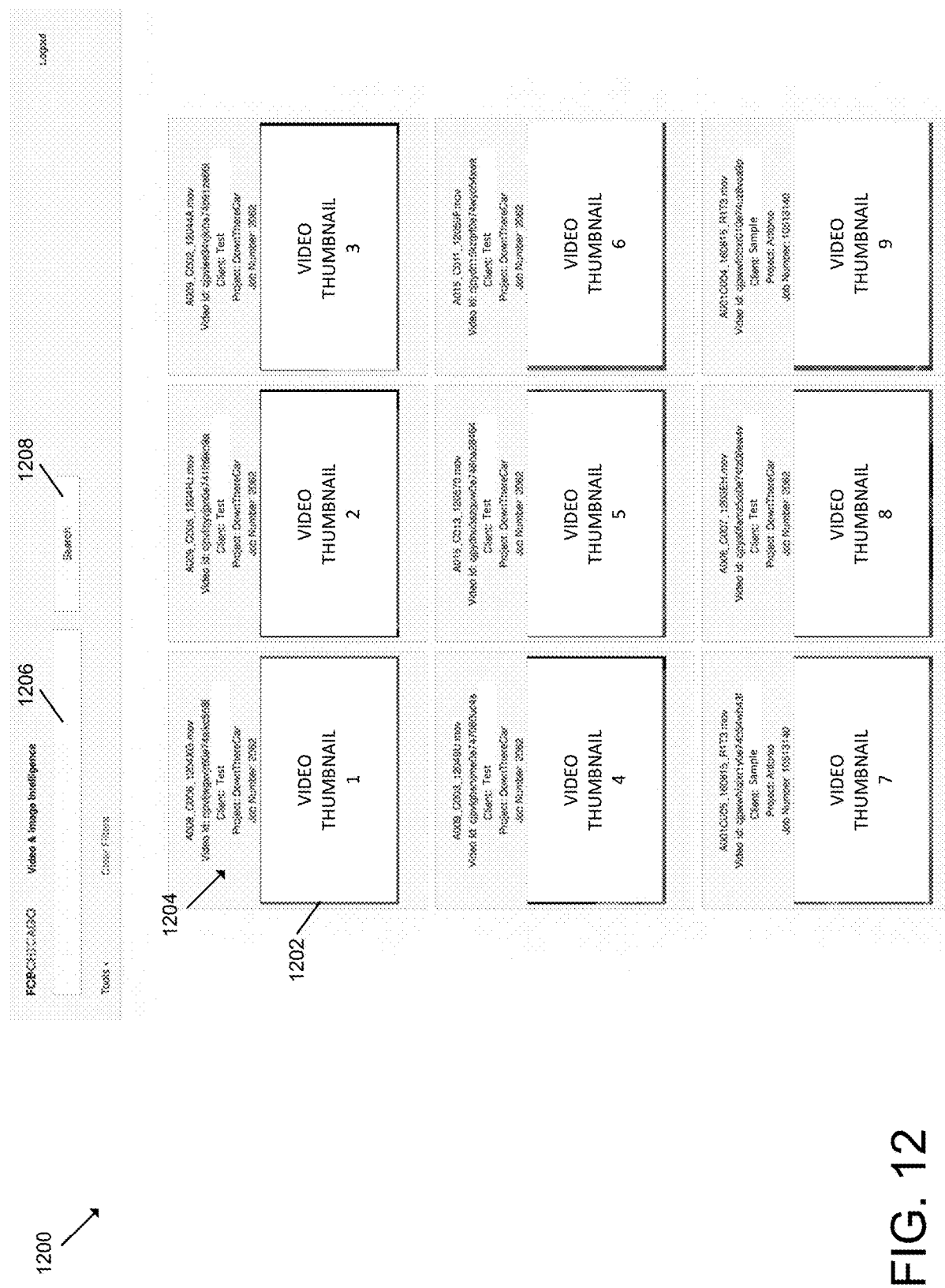
FIGS. 12-20 illustrate various states of at least one embodiment of a graphical user interface of another application executed by the system of FIG. 1.

As shown in FIG. 12, the illustrative graphical user interface 1200 may initially present the user with a grid of thumbnail images 1202 (e.g., depicted as video thumbnails 1-9) and corresponding image/video file data 1204. In particular, the illustrative image/video file data 1204 for each of the thumbnail images 1202 includes a filename, item identifier, client, project, and job number. However, it should be appreciated that the image/video file data 1204 may include additional or alternative data in other embodiments. Similarly, in other embodiments, the thumbnail images 1202 may be presented in another manner. In yet other embodiments, the graphical user interface 1200 may refrain from displaying any thumbnail images 1202 until a search has been performed by the user. As shown, the illustrative graphical user interface 1200 also includes a search query box 1206 and a search button 1208, whereby the user may supply search terms and prompt the search.

Figure 13:
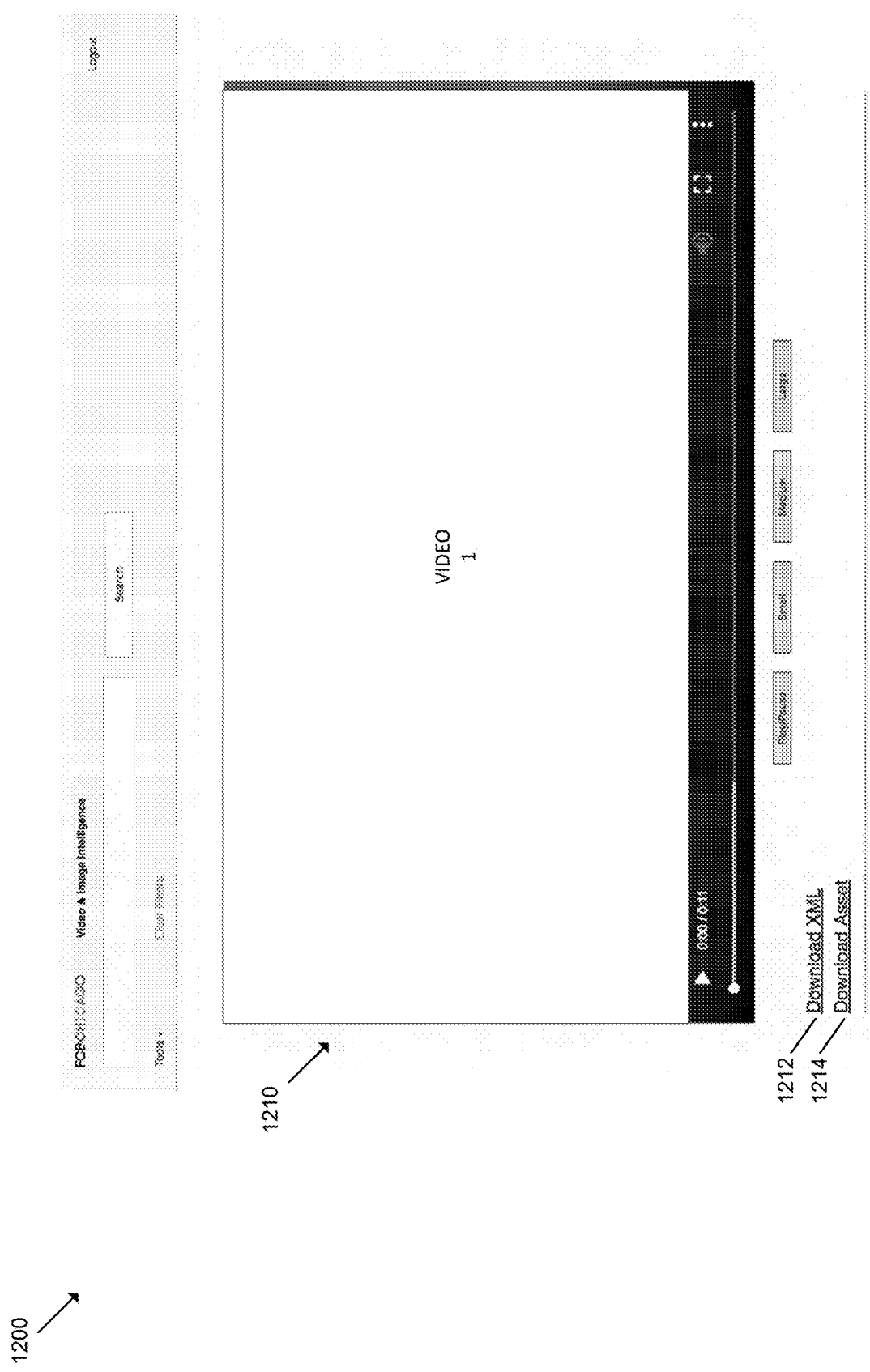
Figure 14:
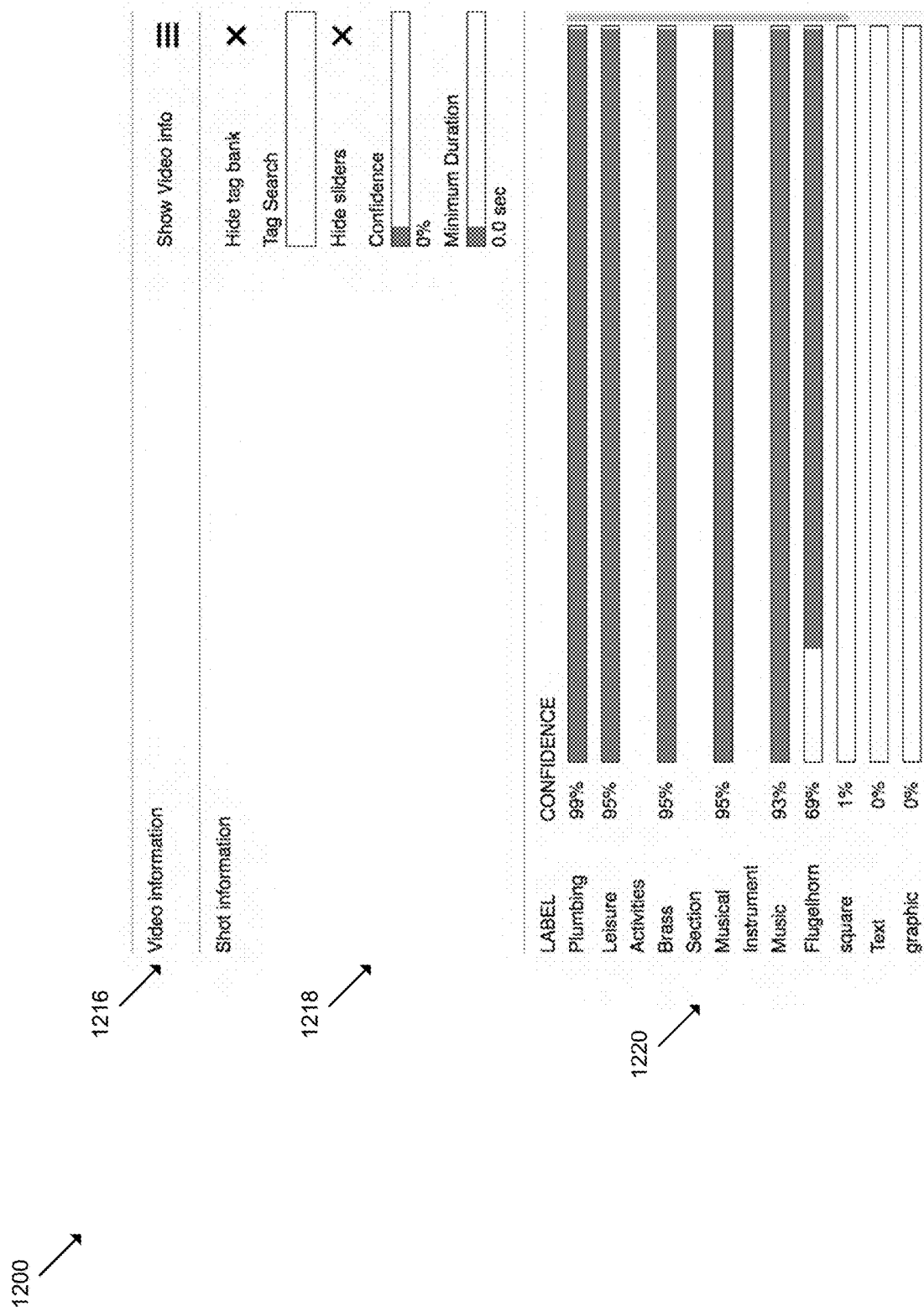
Figure 15:
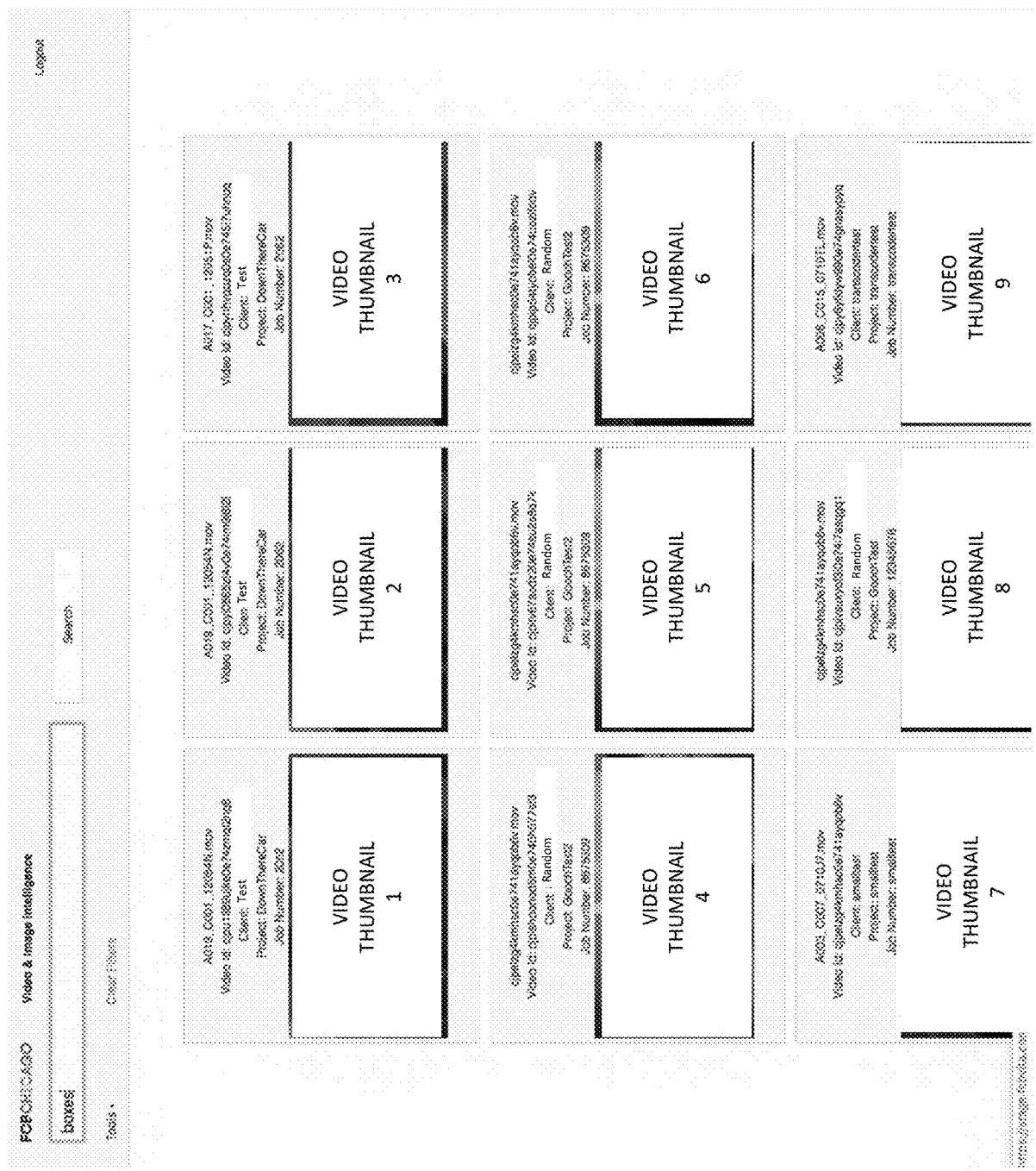

As shown in FIGS. 13-14, if the user selects a particular thumbnail image 1202, the graphical user interface 1200 may display the corresponding video file 1210 (e.g., a compressed version thereof), which may be played by the user via the web application. Further, the illustrative graphical user interface 1200 provides the user with a link 1212 to download a structured file (e.g., an XML file) including the annotations and a link 1214 to download the video file (e.g., the raw video file). Additionally, the illustrative graphical user interface 1200 also provides the user with various video information 1216, shot information 1218, and confidence levels 1220 that various terms are associated with a particular shot/frame or video.

Figure 16:
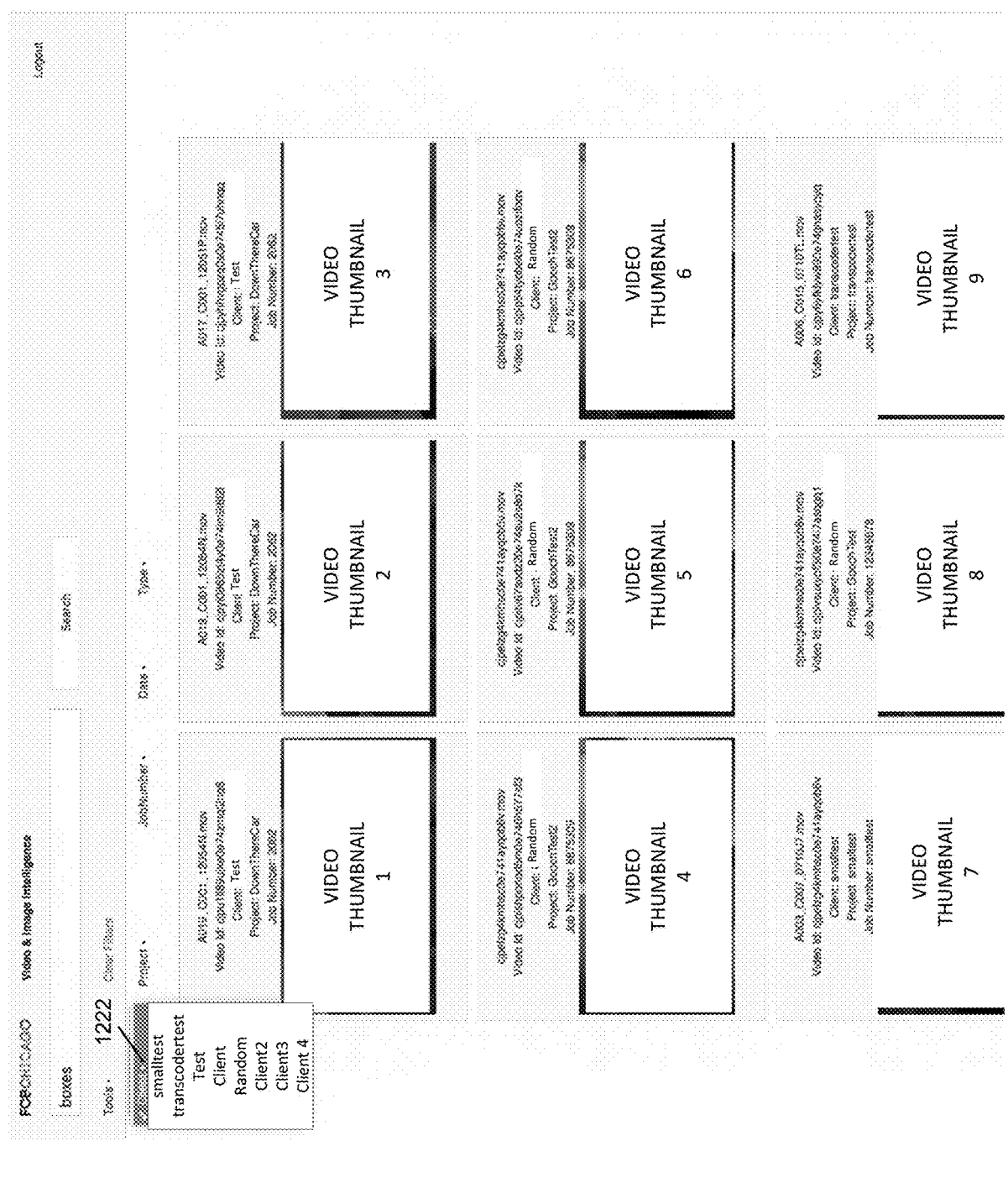
Figure 17:
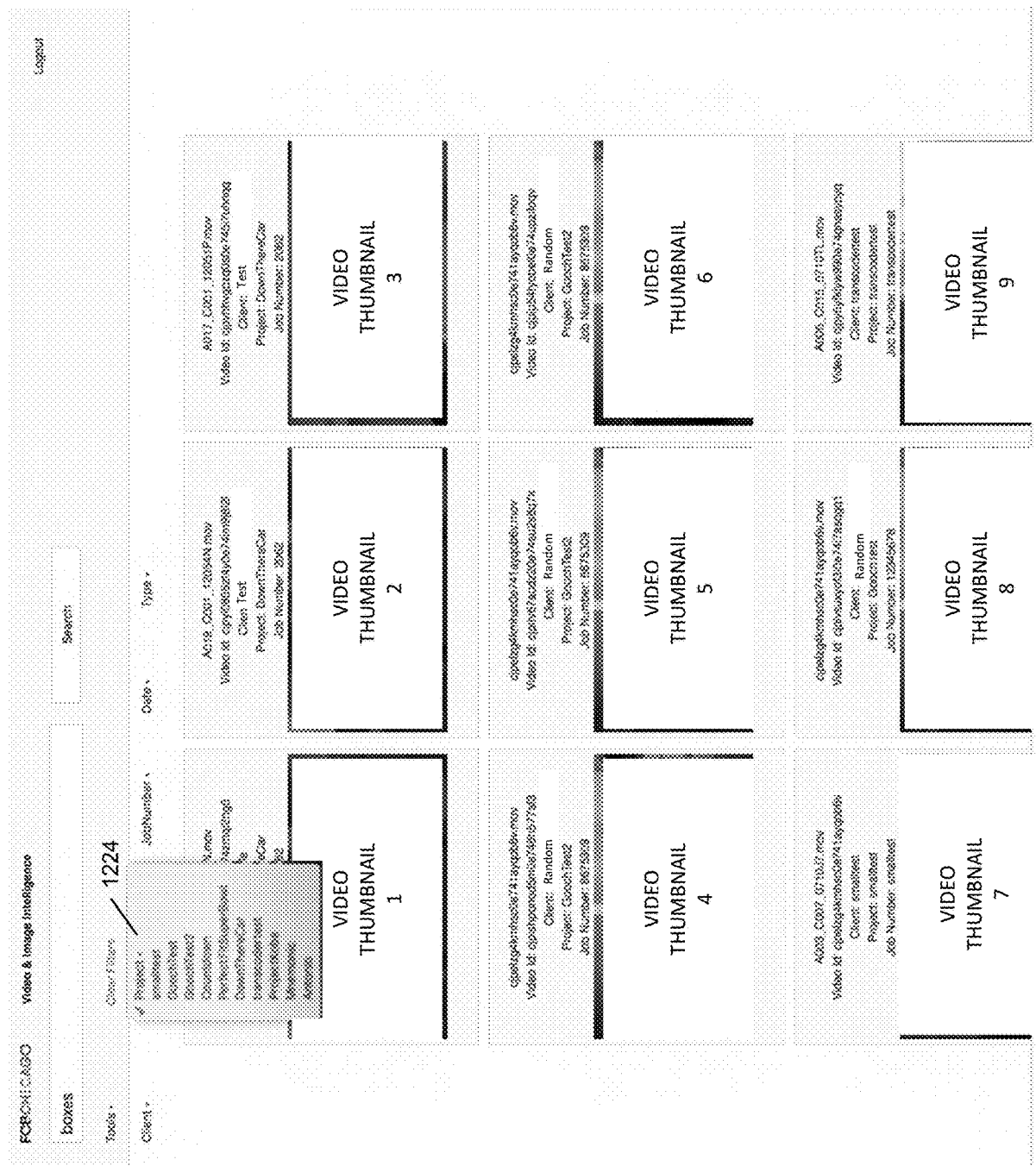
Figure 18:
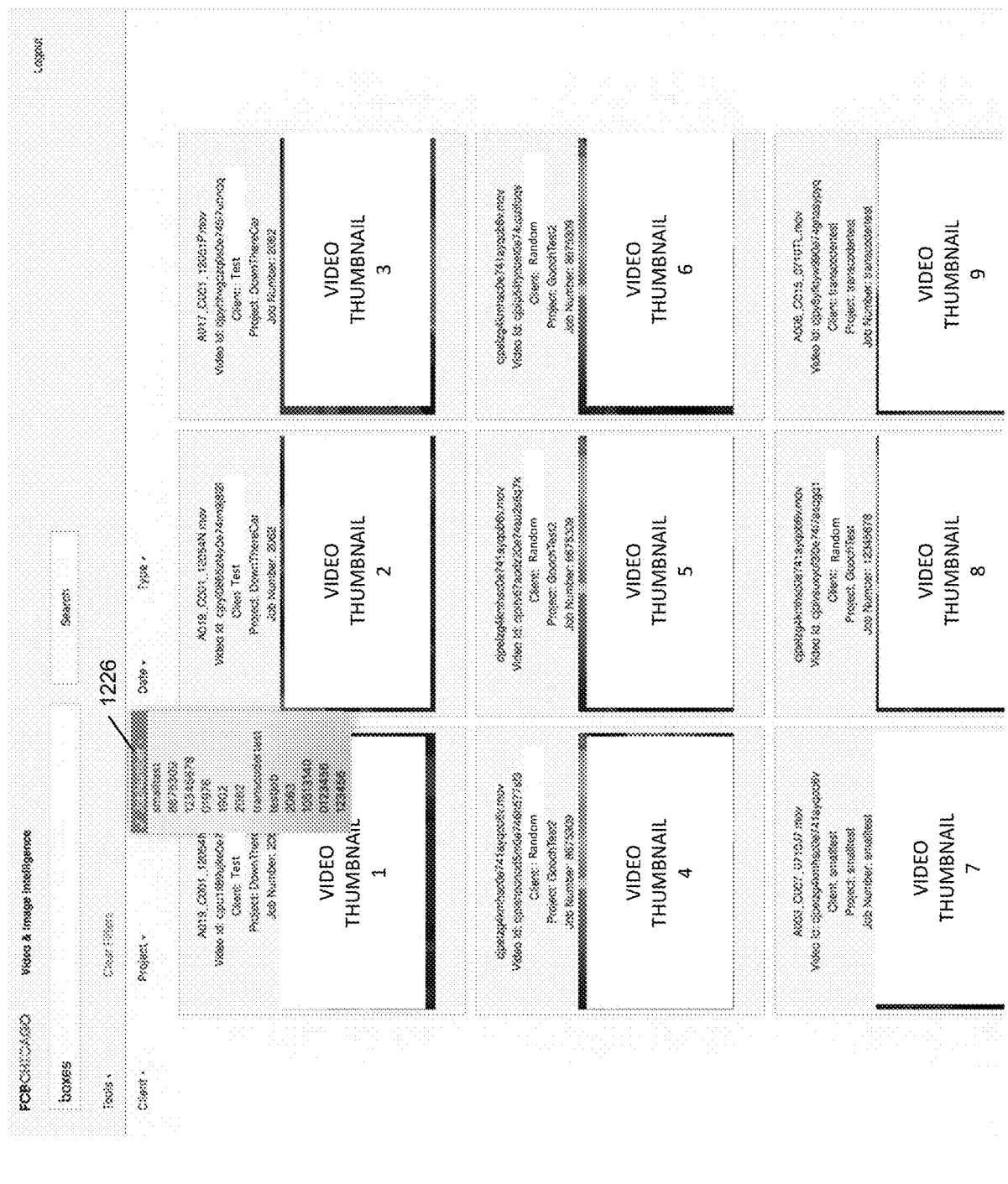
Figure 19:
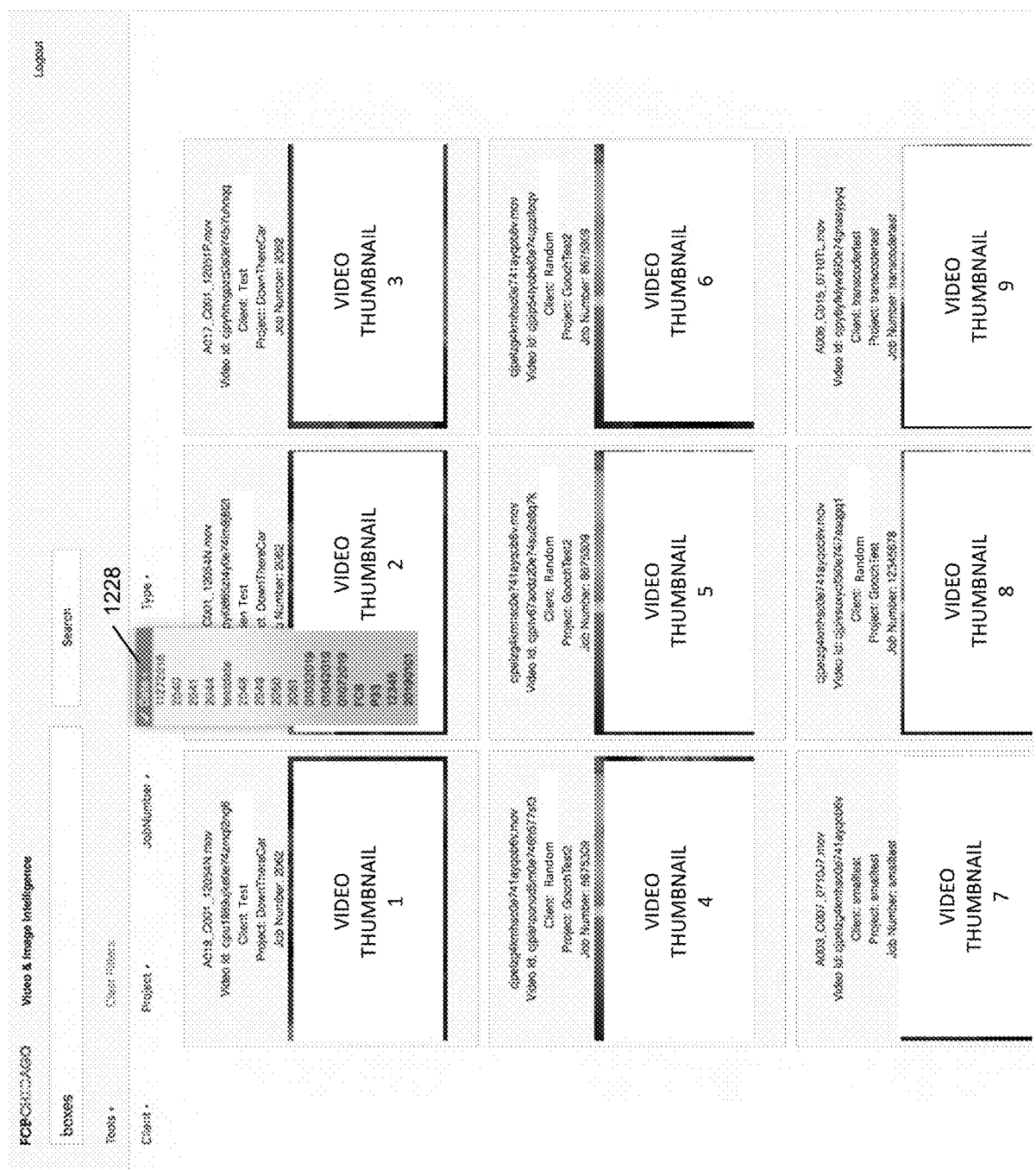
Figure 20:
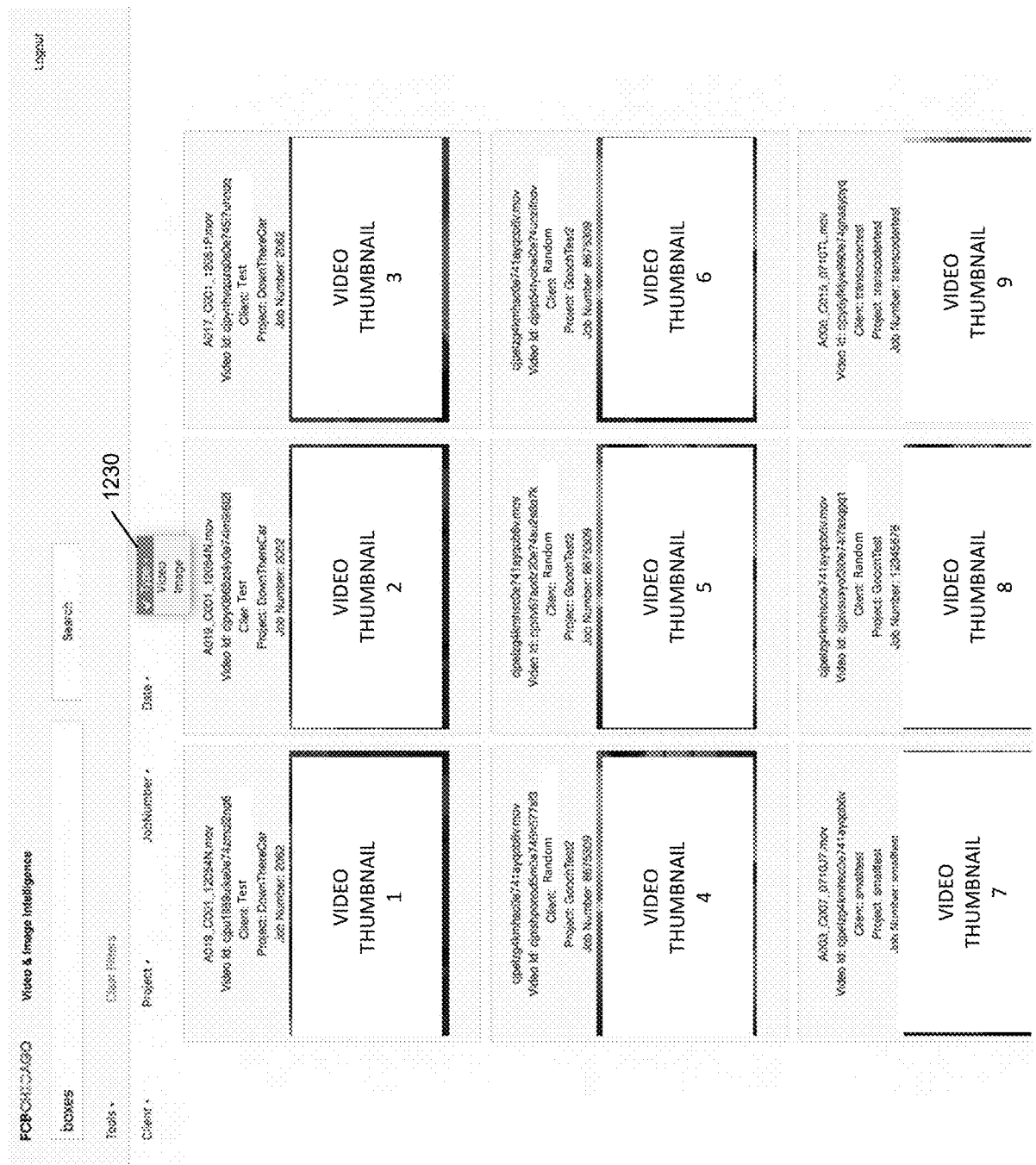

Returning to the grid-based display of the thumbnail images 1202, the user may search for a particular characteristic using the search query box 1206. For example, in the embodiment depicted in FIG. 15, the user is searching for videos/frames including "boxes." As described above, it should be appreciated that the user may enter "natural language" search terms, which may be translated to structured search terms to provide a more natural search experience for the user. In addition to narrowing the search based on one or more search terms, the illustrative graphical user interface 1200 provides various options to filter the search results. More specifically, the illustrative graphical user interface 1200 includes a client dropdown menu 1222 to filter the results by client as shown in FIG. 16, a project dropdown menu 1224 to filter the results by project as shown in FIG. 17, a job number dropdown menu 1226 to filter the results by job number as shown in FIG. 18, a date dropdown menu 1228 to filter the results by date as shown in FIG. 19, and a type dropdown menu 1230 to filter the results by image/file type (e.g., video/image) as shown in FIG. 20. However, it should be appreciated that the graphical user interface 1200 may provide additional or alternative filters in other embodiments.

Although the blocks 502-580 are described in a relatively serial manner, it should be appreciated that various blocks of the method 500 may be performed in parallel in some embodiments.

According to an embodiment, a method may include automatically transcoding a video file to generate a plurality of transcoded files, wherein the plurality of transcoded files includes a first compressed video file and a second compressed video file, transmitting the first compressed video file to a shared data storage, selecting at least one computer vision system to annotate the second compressed video file for searching, transmitting the second compressed video file to each computer vision system of the selected at least one computer vision system, and storing a plurality of annotations generated by the selected at least one computer system to a central database in response to transmittal of the second compressed video file, wherein each annotation of the plurality of annotations identifies at least one visual characteristic of the second compressed video file.

In some embodiments, the plurality of transcoded files may further include a plurality of thumbnail images.

In some embodiments, the method may further include receiving a user's search terms, via a graphical user interface, for at least one video frame having a desired visual characteristic and displaying a set of thumbnail images of the plurality of thumbnail images corresponding with the desired visual characteristic.

In some embodiments, the method may further include performing a search for at least one video frame having a desired visual characteristic based on the user's search terms.

In some embodiments, the desired visual characteristic may include a characteristic of an object in a desired image.

In some embodiments, the user's search terms may include natural language search terms, and performing the search may include translating the user's natural language search terms into structured search terms.

In some embodiments, performing the search may further include applying a machine learning algorithm.

In some embodiments, the method may further include retrieving the video file in response to a user's selection, via the graphical user interface, of a thumbnail image of the set of displayed thumbnail images.

In some embodiments, selecting the at least one computer vision system to annotate the second compressed video file for searching may include receiving a user's selection, via a graphical user interface, of at least one computer vision system to annotate the second compressed video file for searching.

In some embodiments, the method may further include generating, by each computer vision system of the at least one computer vision system, a set of annotations based on the second compressed video, and the plurality of annotations may include each set of annotations generated based on the second compressed video.

In some embodiments, the first compressed video file may be of a first format and the second compressed video file may be of a second format different from the first format.

According to another embodiment, a system may include a central database, a shared data storage, at least one processor, and at least one memory comprising a plurality of instructions stored thereon that, in response to execution by the at least one processor, causes the system to automatically transcode a video file to generate a plurality of transcoded files, wherein the plurality of transcoded files includes a first compressed video file and a second compressed video file, transmit the first compressed video file to the shared data storage, select at least one computer vision system to annotate the second compressed video file for searching, transmit the second compressed video file to each computer vision system of the selected at least one computer vision system, and store a plurality of annotations generated by the selected at least one computer system to the central database in response to transmittal of the second compressed video file, wherein each annotation of the plurality of annotations identifies at least one visual characteristic of the second compressed video file.

In some embodiments, the plurality of transcoded files may further include a plurality of thumbnail images, and the plurality of instructions may further cause the system to receive a user's search terms, via a graphical user interface, for at least one video frame having a desired visual characteristic and display a set of thumbnail images of the plurality of thumbnail images corresponding with the desired visual characteristic.

In some embodiments, the plurality of instructions may further cause the system to perform a search for at least one video frame having a desired visual characteristic based on the user's search terms.

In some embodiments, the user's search terms may include natural language search terms, and to perform the search may include to translate the user's natural language search terms into structured search terms.

In some embodiments, the plurality of instructions may further cause the system to retrieve the video file in response to a user's selection, via the graphical user interface, of a thumbnail image of the set of displayed thumbnail images.

In some embodiments, to select the at least one computer vision system to annotate the second compressed video file for searching may include to receive a user's selection, via a graphical user interface, of at least one computer vision system to annotate the second compressed video file for searching.

In some embodiments, the plurality of instructions may further cause the system to generate, by each computer vision system of the at least one computer vision system, a set of annotations based on the second compressed video, and the plurality of annotations may include each set of annotations generated based on the second compressed video.

In some embodiments, the first compressed video file may be of a first format and the second compressed video file may be of a second format different from the first format.

According to yet another embodiment, a system may include a central database, a shared data storage, a transcode system that automatically transcodes a video file to generate a plurality of transcoded files including a first compressed video file and a second compressed video file and transmits the first compressed video file to the shared data storage, a computing device that provides a first graphical user interface through which a user selects at least one computer vision system to annotate the second compressed video file for searching and transmits the second compressed video file to each computer vision system of the selected at least one computer vision system, a computer vision system that receives the second compressed video file, generates a plurality of annotations based on the second compressed video vile, wherein each annotation of the plurality of annotations identifies at least one visual characteristic of the second compressed file, and store the plurality of annotations to the central database, and a client device that provides a second graphical user interface through which a user enters search terms for at least one video frame having a desired visual characteristic and displays, via the second graphical user interface, a set of thumbnail images that correspond with the desired visual characteristic.

What is claimed is:

1. A method, comprising:
    automatically transcoding a video file to generate a plurality of transcoded files, wherein the plurality of transcoded files includes a compressed video file, and wherein each transcoded file of the plurality of transcoded files is of a different file type;
    selecting at least one computer vision system to annotate the compressed video file for searching;
    transmitting the compressed video file to each computer vision system of the selected at least one computer vision system; and
    receiving and storing a plurality of annotations generated by the selected at least one computer vision system to a central database in response to transmittal of the compressed video file, wherein each annotation of the plurality of annotations identifies at least one visual characteristic of the compressed video file; and further comprising:
    storing a raw grayscale version of the video file to a shared data storage prior to transmitting the compressed video file to each computer vision system; and
    editing the raw grayscale version of the video file prior to receiving the plurality of annotations generated by the selected at least one computer vision system.

2. The method of claim 1, wherein the plurality of transcoded files further comprises a plurality of thumbnail images; and further comprising:
    receiving a user's search terms, via a graphical user interface, for at least one video frame having a desired visual characteristic; and
    displaying a set of thumbnail images of the plurality of thumbnail images corresponding with the desired visual characteristic.

3. The method of claim 2, further comprising:
    performing a search for at least one video frame having a desired visual characteristic based on the user's search terms; and
    identifying a time frame within the video file at which the at least one video frame can be found.

4. The method of claim 3, wherein the user's search terms comprise natural language search terms; and
    wherein performing the search comprises applying a machine learning algorithm and translating the user's natural language search terms into structured search terms.

5. The method of claim 2, further comprising retrieving the video file in response to a user's selection, via the graphical user interface, of a thumbnail image of the set of displayed thumbnail images.

6. The method of claim 1, further comprising displaying, via a graphical user interface, a plurality of computer vision systems for a user to select from to annotate the compressed video file for searching; and
    wherein selecting the at least one computer vision system to annotate the compressed video file for searching comprises receiving the user's selection, via the graphical user interface, of at least one computer vision system of the plurality of computer vision systems displayed to the user to annotate the compressed video file for searching.

7. The method of claim 1, further comprising generating, by each computer vision system of the at least one computer vision system, a set of annotations based on the compressed video; and
    wherein the plurality of annotations comprises each set of annotations generated based on the compressed video.

8. The method of claim 1, wherein the video file is of a first file type and the compressed video file is of a second file type different from the first file type.

9. The method of claim 8, wherein the video file includes raw grayscale images and the compressed video file includes color-added images.

10. The method of claim 1, wherein the plurality of transcoded files further comprises a plurality of thumbnail images corresponding with particular frames within the video file, and further comprising: receiving a user's search terms, via a graphical user interface, for at least one video frame having a desired visual characteristic; performing a search for at least one video frame having the desired visual characteristic based on the user's search terms; displaying a set of thumbnail images of the plurality of thumbnail images; and displaying a level of confidence for each thumbnail image of the set of the thumbnail images that the thumbnail image corresponds with the desired visual characteristic.

11. The method of claim 1, wherein selecting the at least one computer vision system comprises selecting a first computer vision system and a second computer vision system to annotate the compressed video file for searching; wherein storing the plurality of annotations generated by the selected at least one computer vision system comprises storing a first plurality of annotations generated by the first computer vision system and a second plurality of annotations generated by the second computer vision system.

12. The method of claim 1, wherein the plurality of transcoded files includes a first transcoded file having an mp4 file type and a second transcoded file having an mp3 file type.

13. A system, comprising:
a central database;
a shared data storage;
at least one processor; and
at least one memory comprising a plurality of instructions stored thereon that, in response to execution by the at least one processor, causes the system to:
store a raw grayscale version of a video file to the shared data storage;
edit the raw grayscale version of the video file;
automatically transcode the video file to generate a plurality of transcoded files, wherein the plurality of transcoded files includes a compressed video file, wherein each transcoded file of the plurality of transcoded files is of a different file type;
select at least one computer vision system to annotate the compressed video file for searching;
transmit the compressed video file to each computer vision system of the selected at least one computer vision system subsequent to storage of the raw grayscale version of the video file to the shared data storage; and
store a plurality of annotations generated by the selected at least one computer system to the central database in response to transmittal of the compressed video file and subsequent to edit of the raw grayscale version of the video file, wherein each annotation of the plurality of annotations identifies at least one visual characteristic of the compressed video file.

14. The system of claim 13, wherein the plurality of transcoded files further comprises a plurality of thumbnail images; and
wherein the plurality of instructions further causes the system to:
receive a user's search terms, via a graphical user interface, for at least one video frame having a desired visual characteristic;
display a set of thumbnail images of the plurality of thumbnail images corresponding with the desired visual characteristic; and
retrieve the video file in response to a user's selection, via the graphical user interface, of a thumbnail image of the set of displayed thumbnail images.

15. The system of claim 14, wherein the plurality of instructions further causes the system to:
perform a search for at least one video frame having a desired visual characteristic based on the user's search terms; and
identify a time frame within the video file at which the at least one video frame can be found;
wherein the user's search terms comprise natural language search terms; and
wherein to perform the search comprises to translate the user's natural language search terms into structured search terms.

16. The system of claim 13, wherein to select the at least one computer vision system to annotate the compressed video file for searching comprises to receive a user's selection, via a graphical user interface, of at least one computer vision system to annotate the compressed video file for searching, wherein the at least one computer vision system is selected by the user from a plurality of computer vision systems displayed to the user via the graphical user interface.

17. The system of claim 13, wherein the video file is of a first file type and the compressed video file is of a second file type different from the first file type.

18. A system, comprising:
a central database;
a shared data storage configured to store a raw grayscale version of a video file captured by a camera;
a first computing device that edits the raw grayscale version of the video file;
a transcode system that automatically transcodes the video file to generate a plurality of transcoded files including a compressed video file, wherein each transcoded file of the plurality of transcoded files is of a different file type;
a second computing device that (i) provides a first graphical user interface through which a user selects at least one computer vision system to annotate the compressed video file for searching and (ii) transmits the compressed video file to each computer vision system of the selected at least one computer vision system subsequent to storage of the raw grayscale version of the video file to the shared data storage;
a computer vision system that (i) receives the compressed video file, (ii) generates a plurality of annotations based on the compressed video file, wherein each annotation of the plurality of annotations identifies at least one visual characteristic of the compressed file, and (iii) stores the plurality of annotations to the central database subsequent to edit of the raw grayscale version of the video file; and
a client device that (i) provides a second graphical user interface through which a user enters search terms for at least one video frame having a desired visual characteristic and (ii) displays, via the second graphical user interface, a set of thumbnail images that correspond with the desired visual characteristic.

* * * * *